(12) United States Patent
Oyama et al.

(10) Patent No.: US 7,738,254 B2
(45) Date of Patent: Jun. 15, 2010

(54) DISK ARRAY SYSTEM

(75) Inventors: Yuri Oyama, Odawara (JP); Tsuyoshi Sasagawa, Odawara (JP); Chikazu Yokoi, Odawara (JP)

(73) Assignee: Hitachi, Ltd., Chiyoda-ku, Tokyo (JP)

( * ) Notice: Subject to any disclaimer, the term of this patent is extended or adjusted under 35 U.S.C. 154(b) by 164 days.

(21) Appl. No.: 12/010,294

(22) Filed: Jan. 23, 2008

(65) Prior Publication Data

US 2008/0239655 A1 Oct. 2, 2008

(30) Foreign Application Priority Data

Mar. 30, 2007 (JP) ............................. 2007-091647

(51) Int. Cl.
*H05K 7/16* (2006.01)
(52) U.S. Cl. ...................................... 361/725; 361/798
(58) Field of Classification Search ................. 361/725, 361/600, 724–730, 755, 796–798, 800–802; 211/13.1, 41.1, 41.17; 312/223; 439/55, 439/64, 67, 152–153, 374, 377
See application file for complete search history.

(56) References Cited

U.S. PATENT DOCUMENTS

| | | | | |
|---|---|---|---|---|
| 7,298,624 B2 * | 11/2007 | Boswell et al. | ............. | 361/727 |
| 7,307,836 B2 * | 12/2007 | Scicluna et al. | ........ | 361/679.33 |
| 7,342,780 B2 * | 3/2008 | Scicluna et al. | ........ | 361/679.33 |
| 7,425,685 B1 * | 9/2008 | Gundogan et al. | .......... | 174/520 |
| 7,515,427 B2 * | 4/2009 | King et al. | .................. | 361/725 |
| 2008/0239657 A1 * | 10/2008 | Oyama et al. | ................ | 361/685 |
| 2008/0259555 A1 * | 10/2008 | Bechtolshiem et al. | ....... | 361/686 |

* cited by examiner

*Primary Examiner*—Hung S Bui
(74) *Attorney, Agent, or Firm*—Volpe and Koenig, P.C.

(57) ABSTRACT

The disk array system includes: controller modules, power source modules, and battery modules of a basic chassis; enclosure modules and power source modules of an expanded chassis; and operation levers which are commonly used for operations of insertion/removal and fixation of the modules. The operation lever includes a rotary shaft portion serving as a fulcrum point, a lever main body and a latch portion located on one side of the lever, and a hook portion located on the other side thereof. When a module is inserted and fixed, a user rotates the lever main body. By this means, the latch portion and the hook portion are fixed to a receiving portion and the module is connected and fixed to the backboard with a connector.

10 Claims, 23 Drawing Sheets

FIG. 12
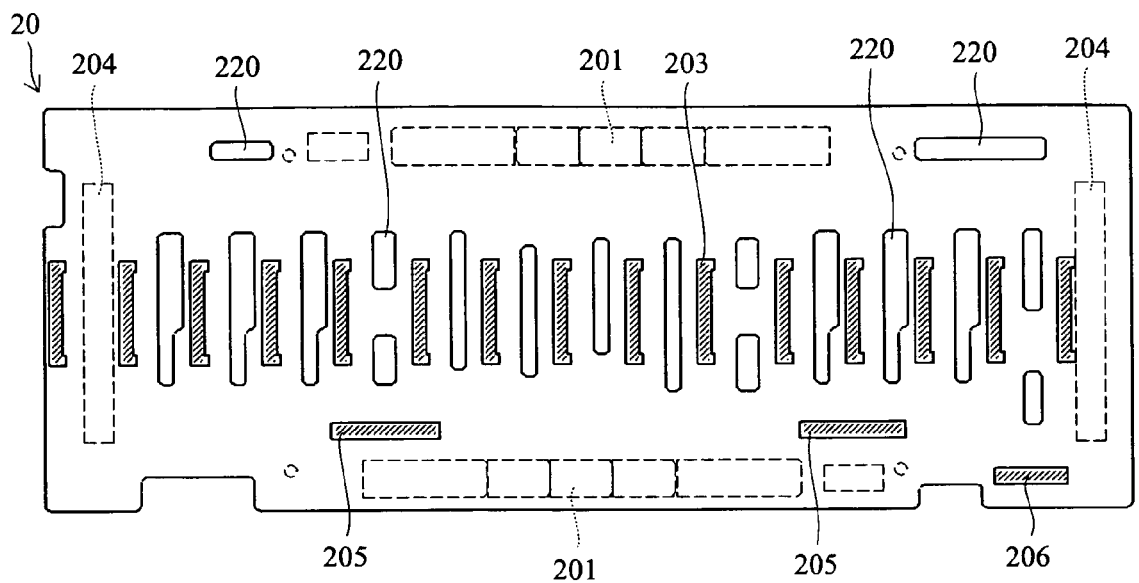
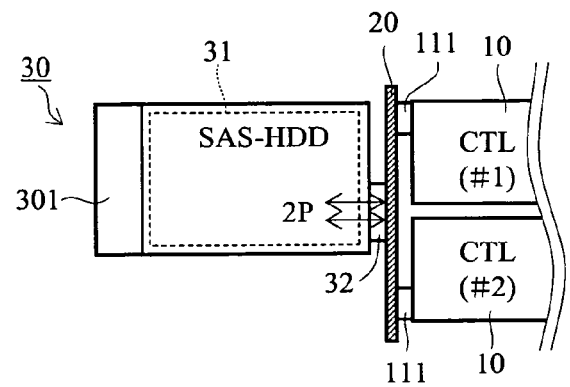
FIG. 13A
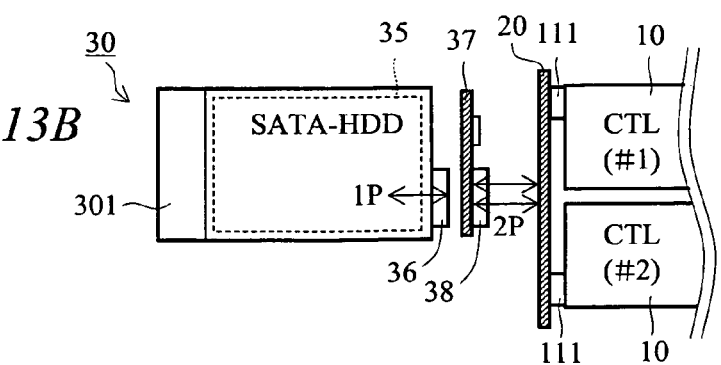
FIG. 13B

DISK ARRAY SYSTEM

CROSS-REFERENCE TO RELATED APPLICATION

The present application claims priority from Japanese Patent Application No. JP 2007-091647 filed on Mar. 30, 2007, the content of which is hereby incorporated by reference into this application.

TECHNICAL FIELD OF THE INVENTION

The present invention relates to a disk array system (also referred to as a storage system) having a function to control a storage device such as a HDD (Hard Disk Drive). More particularly, it relates to a structure and method for a handle, a lever and others for use in operations (actions) of a module such as insertion/removal and fixation thereof.

BACKGROUND OF THE INVENTION

In a recent disk array system, mounting density has been increased and performance thereof has been improved. Accordingly, higher cooling performance has been demanded in order to cope with the temperature rise due to the increase in heat generation of component parts and resulting performance deterioration.

For example, in the disk array system of a predetermined method, elements such as boards (circuit boards) corresponding to various functions and power sources are installed in the system chassis by means of the structure and method of a module (also referred to as a unit, package, and assembly) to take the maintainability into consideration. Further, as a structure and method for operations by a maintenance person such as insertion/removal and fixation of the module, the module is provided with a structure (hereinafter, referred to as operating structure) such as a handle and a lever. Conventionally, the structure and method for operation of the module are different depending on the modules (for example, controller module, power source module and the like) because of the difference in the mounting structure of the system chassis and each module. Further, the module is handled mainly by a maintenance person with knowledge.

SUMMARY OF THE INVENTION

The structure and method for operations of the module such as insertion/removal and fixation thereof in the configuration of the chassis and module of a conventional disk array system are insufficient in operability because plural types of the structures and methods are mixed. In particular, this is not suitable for the operations by an end user without sufficient knowledge. Further, as another example of the operating structure, the module is fixed to the chassis with screws using a tool such as a screw driver. In this case, since there is a possibility that the screws which constitute the module itself are not operated appropriately, the operability is insufficient. Further, since outer appearance of each operating structure such as shape and color is different, the operability is insufficient.

The present invention has been made in view of the above-described problems, and an object of the present invention is to provide a technology for realizing the structure and method for operations such as insertion/removal and fixation of the module that can efficiently improve the operability in consideration of the operation by an end user in the disk array system in which high density mounting and cooling performance are taken into consideration.

The typical ones of the inventions disclosed in this application will be briefly described as follows. In order to achieve the above-described object, the present invention provides a disk array system comprising a group of storage devices (disk array) such as a HDD and a control device thereof (controller or disk controller), wherein elements such as controllers and power sources are installed in the system chassis by means of the structure and method of a module, and in a redundant configuration in which each function is at least duplicated, each module is inserted or removed through the opening in front or at the back of the chassis and connected to the front or rear surface of a backboard inside the chassis, and wherein technological means and configurations as shown below are provided.

According to the present invention, in the disk array system in which high density mounting and cooling performance are taken into consideration, as a structure and method for operations such as insertion/removal and fixation of a module to a chassis, a new operating structure (referred to as operation lever herein) which takes into consideration the operation of an end user is provided on an object module so as to correspond to the structure of the chassis and module. The present invention includes mainly (1) a structure in which common operation levers are provided to plural types of modules, (2) a structure in which common operation levers designed based on a controller module (necessary operation forces are estimated from a connector coupling force (insertion/removal force)) are provided to other various types of modules, and (3) detailed configuration about the number, location, and mounting method of the operation levers, which differs depending on the detailed structure of each module.

In the disk array system of the present invention, first, the chassis and module thereof have the following configuration in consideration of the high density mounting and cooling performance. In the basic chassis, a storage device module (for example, SAS HDD) and a battery module are installed from the front surface into the front part of a backboard, and duplex (two) controller modules are installed up and down from the rear surface and duplex (two) power source modules each containing a fan unit (plural fans) are installed in the right and left areas thereof in the rear part. Further, in the expanded chassis, an enclosure module is to be installed instead of the controller module, and a storage device module is installed from the front surface into the front part of the backboard, and duplex (two) enclosure modules are installed side by side in an upper area of the rear part from the rear surface and duplex (two) power source modules each containing the fan unit (plural fans) are installed side by side in the lower area. In the basic chassis, HDD connectors are disposed near the center area in the longitudinal direction of the backboard so as to correspond to the positions of the connectors of the SAS HDDs, and connectors of the controller are disposed near the upper and lower sides of the backboard so as not to interfere with the HDD connectors. Further, the two power source modules are disposed in right and left areas of the two controller modules so as to correspond to the positions near the right and left sides of the backboard.

(1) The modules to which the operation levers are provided include five types, for example, a controller module, a power source module, and a battery module of the basic chassis and an enclosure module and a power source module of the expanded chassis. A plurality of storage device modules are excluded from the object for consideration because there occurs no problem in operability if a structure such as its own handle is provided. In this structure, the common operation lever is a latch-type lever which is constituted of a lever main body (rod-like component), a screw fixing portion (rotary shaft portion), a latch portion (fixed latch portion), and a hook portion and applies the principle of leverage. One or more operation levers are attached to predetermined positions of one module in consideration of a force necessary for operation of the module (operation force). The lever main body can be moved up and down with respect to a module surface around a rotary shaft portion as a fulcrum point. The latch portion is hooked and fixed to the structure of a receiving portion on the chassis side or the module side by the latch action when the module is fixed. The hook portion is hooked and fixed to the structure of a receiving portion on the chassis side when the module is fixed.

(2) If the structure of the chassis and module is considered in the design of the common operation lever for the above-mentioned modules, the operation force necessary for the operations of insertion/removal and fixation of the module is estimated from a connector coupling force for the connection to the backboard, and for example, the operation force is largest in the controller module of the basic chassis. Accordingly, the structure of the operation lever to be provided to the controller module is determined based on the controller module. Then, that operation lever is applied to other modules in common, that is, all the object modules are provided with the common operation levers. As a condition for the common use of the operation lever, an operation lever (one of two operation levers) of the controller module covers the operation force of an operation lever in other modules.

For example, a controller substrate is mounted in the controller module and its connector on the rear surface side is connected to a corresponding connector on the backboard (coupled through connector). The operation force necessary for the operation of the controller module is estimated from the position, number, coupling force, and force balance of the connectors. Then, the operation lever (for example, two operation levers) to be provided in the controller module is designed in accordance with the operation force.

Basically, the operation lever is preferably disposed at a position (ideal position) on an extension line (same plane as connector arrangement plane) from the central position of a connector (backboard connecting connector) on the module rear surface to the front surface of the module on an opposite side. One or more operation levers are disposed in an area near the ideal position on the module front surface so as to satisfy the condition of the operation force necessary for the module. It is preferable that the hook portion of the operation lever is disposed at the ideal position. Further, the arrangement of the operation lever at the ideal position is difficult in some cases due to the detailed requirement for module installation. In this case, the operation lever is disposed at a position shifted from the ideal position to its surrounding area.

(3) The detailed configuration of the operation levers to be provided to various object modules including the aforementioned operation lever provided to the controller module is determined. Since the installation area, connector coupling force and detailed requirement for mounting differ depending on each module, the difference in the configuration of the operation levers for each module, for example, the number of arranged levers, position and mounting method thereof is determined in detail in accordance with the differences. As for the number of the operation levers to be arranged, an operation lever is arranged if the necessary operation force is satisfied or two levers are arranged if the operation force is insufficient. The arrangement position is a position exposed on a side of an opening of the chassis in consideration of the position of a connector for the connection to the backboard. As for the mounting method of the operation lever component, the operation lever is disposed and mounted inside (in a recessed portion) or outside (on a projected portion) the module area which is substantially box-shaped in its external shape, and alternatively, the receiving portion for the operation lever component is provided in the form of an internal mounting portion (recessed portion) or an external mounting portion (projected portion) in an area on the chassis side or module side.

(4) The configuration of the module and operation lever is as follows. By fixing a screw fixing portion of the operation lever at a predetermined position of the module, the module having the operation lever is formed. The operation lever has a lever main body of a predetermined length on one end side relative to the screw fixing portion (rotary shaft portion) which serves as a fulcrum point, a latch portion which is a movable portion at a tip of the lever main body, and a hook portion at a position in a predetermined length on the other end side. The lever main body, screw fixing portion, and hook portion are, for example, an integral structural member. A spring portion is incorporated between the lever main body and the latch portion for the latching action of the latch portion to the receiving portion on the module side or the chassis side. The latch portion is accommodated in the lever main body in a state where it is in contact with the spring portion, and the initial position of the operation lever (latch portion) is determined so that the tip of the latch portion is projected from the lever main body when a part of the latch portion (fastening portion) is hooked to a part (hole portion) of the lever main body. When the tip of the latch portion is pressed by a user or the latch portion is pressed with a rotation of the lever main body, the spring portion is flexed and the latch portion is moved in the length direction of the lever main body, and at the same time, a claw portion which is a part of the latch portion is moved.

In the operations of insertion and fixation of the module using the operation lever, the lever main body of the operation lever is moved down relative to the module surface with the screw fixing portion acting as a fulcrum point by a user. Along with the operation (consecutively), an action of pressing the tip of the latch portion is carried out automatically or consciously. Accordingly, the claw portion of the latch portion gets into the receiving portion on the module side or chassis side in the state where the spring portion is flexed, and then it is hooked and fixed (latched) by an elastic force of the spring portion. At the same time, the hook portion on the other end side of the screw fixing portion also gets into the receiving portion on the chassis side and is hooked and fixed. Further, the module is connected to the backboard through a connector in the mounting area in the chassis, and it is fixed securely by the operation lever. In the operation for removing the module and releasing the fixation thereof using the operation lever, the action reverse to that described above is carried out.

(5) Further, in this configuration, the operation lever (particularly, lever main body which is an object for rotation action) of each module, which is a portion to be operated by a user, is colored in a predetermined color so as to be distinguished from the module itself to improve the visibility. In addition, the latch portion which is an object to be pressed (shifted) of the operation lever is colored so as to be distinguished from other portions to improve the visibility. Consequently, a portion for the operation (action) by a user becomes easy to find, and the operability can be thus improved.

(6) Further, the operation lever has a structure which can be disassembled to respective components easily without any special tool. When disassembling it into components for recycle, a user presses a part (fastening portion) of the latch portion toward the inside through a hole in the front surface of the lever main body of the operation lever. By this means, hooking of the fastening portion to the lever main body is released and the latch portion is detached from the lever main body, and the incorporated spring portion is taken out.

The effects obtained by typical aspects of the present invention will be briefly described below. According to the present invention, it is possible to realize the structure and method for operations such as insertion/removal and fixation of the module that can efficiently improve the operability in consideration of the operation by an end user in the disk array system in which high density mounting and cooling performance are taken into consideration.

BRIEF DESCRIPTIONS OF THE DRAWINGS

FIG. 12 is a diagram showing the configuration of the basic chassis seen from the front surface side of the backboard;

FIG. 13A is a diagram showing a configuration of the connection of a HDD module to the backboard of the basic chassis in the case of a SAS-HDD;

FIG. 13B is a diagram showing a configuration of the connection of a HDD module to the backboard of the basic chassis in the case of a SATA-HDD;

DESCRIPTIONS OF THE PREFERRED EMBODIMENTS

Figure 1:
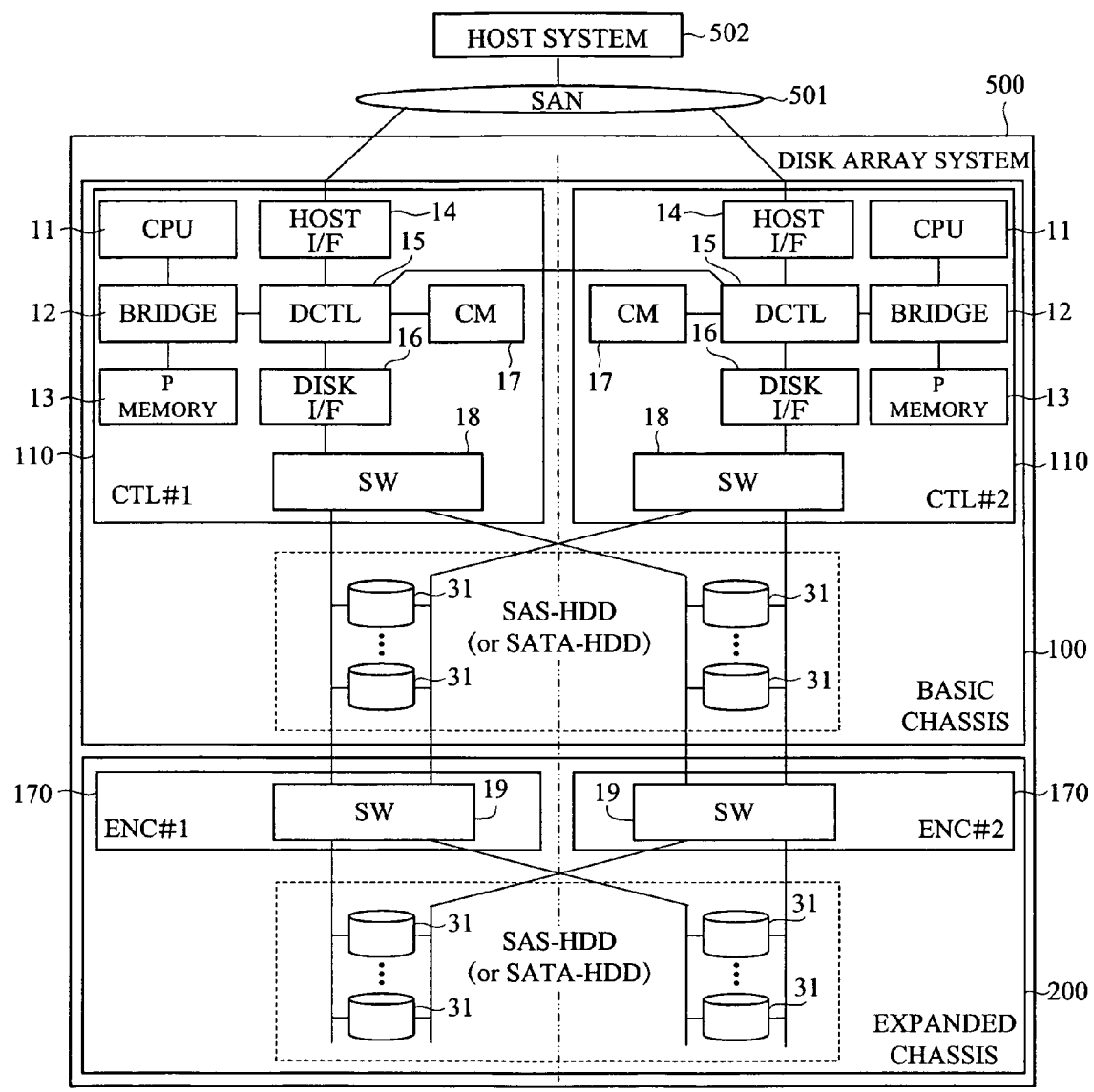
FIG. 1 is a diagram showing a configuration of an information processing system by a disk array system according to an embodiment of the present invention.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Features of the Embodiment

A disk array system according to an embodiment of the present invention will be described with reference to FIG. 1 to FIG. 32. The main features of the present embodiment are as follows. In a disk array system 500, for example, in a basic chassis 100, HDD modules 30, battery modules 50 and others are installed in a front part 1 of a backboard 20 from a front surface (A), and duplex CTL modules 10 and duplex power source modules 40 containing fan units 42 are installed in a rear part 2 from a rear surface (B). Also, in an expanded chassis 200, HDD modules 30 are installed in a front part 3 of a backboard 20B from the front surface (C), and duplex ENC modules 70 and duplex power source modules 80 are installed in a rear part 4 from a rear surface (D). In this structure, as the operating structure for operations of insertion/removal and fixation of a module, an operation lever 5 is used in common for the five types of modules, that is, the CTL module 10, the power source module 40, and the battery module 50 of the basic chassis 100 and the ENC module 70 and the power source module 80 of the expanded chassis 200.

FIG. 1 shows a functional block configuration of the information processing system of the disk array system 500. First, the configuration of the entire system will be described, and then, its characteristic structure will be described. A host system 502 is a high order information processing system such as a PC, a server, and a main frame used by a user. The host system 502 and the disk array system 500 are connected by communication means such as a SAN (Storage Area Network) 501 or a LAN (Local Area Network).

The disk array system 500 mainly comprises a basic chassis 100 and an expanded chassis 200. The basic chassis 100 is provided with both a control function (CTL 110 and the like) and a storage function (HDD 31 group). The expanded chassis 200 is optional and is mainly provided with the storage function (HDD 31 group).

A controller (CTL#1 and #2) 110 comprises a CPU 11, a bridge 12, a program memory (P memory) 13, a host I/F (also referred to as a host interface control unit, a channel I/F control unit, and the like) 14, a data controller (DCTL) 15, a disk I/F (disk interface control unit) 16, a cash memory (CM) 17, a switch (SW) 18, and others.

The CPU 11 executes a program stored in the program memory 13 through the bridge 12, thereby performing a processing to control the entire system. The DCTL 15 mutually connects each of the units and controls data transmission. The cache memory CM 17 is a shared memory to cash (store) the data in the CTL 110. The host I/F 14 is a processing unit to which the host system 502 and the like are connected. The disk I/F 16 is a processing unit to which the HDD 31 group is connected via the SW 18.

The SW 18 has a SAS expander (EXP) function and an environment management function. The EXP function is a function such as an access control for the group of HDDs 31 corresponding to the SAS interface. The environment management function includes a function (conventional environment management function) to monitor and detect a trouble, a failure and a state such as connection of resources including a power source (PS), fans, and the HDD 31, and a temperature management function (cooling management function) including a fan control.

The HDD 31 is the SAS HDD (or SATA interface HDD). On the physical memory area provided by the HDD 31 group, a logical volume which is a logical memory area is set. Further, a RAID group by the plurality of HDDs 31 is set, and a RAID control can be executed. The SAS HDDs 31 are connected by "two-path two-port" to the switches SW18 and SW19.

The enclosure (ENC#1 and #2) 170 comprises the SW19 and performs a connection with the CTL 110 and a relay to the ENC 170 when another ENC 170 is connected. The SW 19 has a function similar to that of the SW18 in the CTL 110 of the basic chassis 100, and it takes charge of the control in the expanded chassis 200. The SW18 of the basic chassis 100 and the SW19 of the expanded chassis 200 are connected, and the disk I/F 16 can access the target HDDs 31 in the basic chassis 100 and the expanded chassis 200.

As shown by a chain line in the center, the CTL 110, ENC 170, HDD 31 group, and others are duplicated, and an access can be made from one side (#1 and #2) to the other side (#2 and #1).

The data processing in the disk array system 500 is as follows. In response to a data write request (command) from the host system 502, the CTL 110 temporarily stores the data received from the host I/F 14 in the CM 17 and writes the data in the predetermined logical volume on the HDD 31 group by the disk I/F 16. Further, in response to the data read request (command) from the host system 502, the CTL 110 reads the data from the predetermined logical volume on the HDD 31 group by the disk I/F 16 and stores the data temporarily in the CM 17, and then transmits it to the host system 502 through the host I/F 14. Since a plurality of host I/Fs 14 and a plurality of disk I/Fs 16 are provided in this configuration, a plurality of data inputs and outputs can be processed in parallel.

<System (2)>

Figure 2:
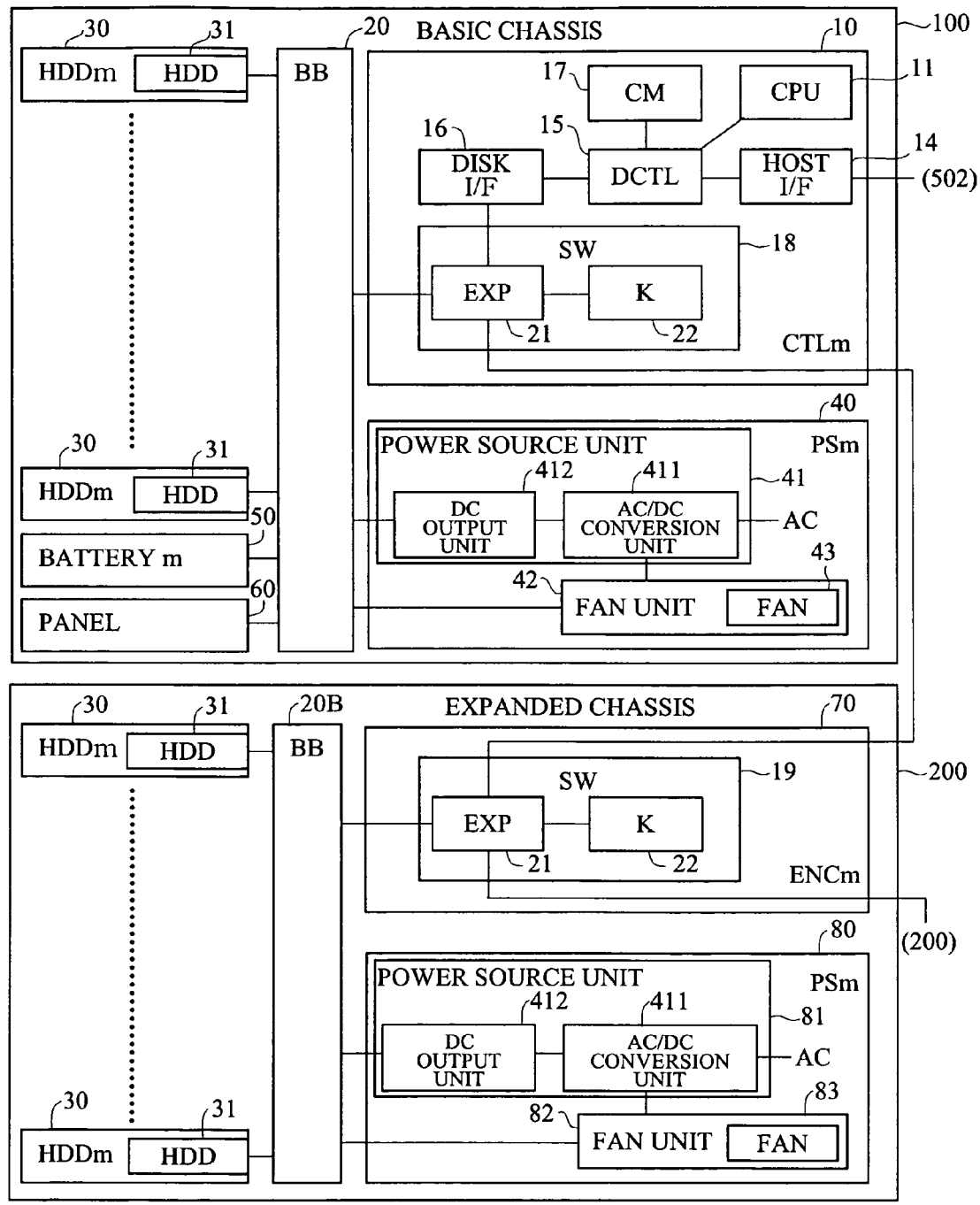
FIG. 2 is a diagram showing a system configuration by the connection of modules to backboards in a basic chassis and an expanded chassis in the disk array system of the present embodiment.

FIG. 2 shows a system configuration (duplicated parts are omitted) for connecting the modules (shown by m) to the backboards (BB) 20 and 20B in the basic chassis 100 and the expanded chassis 200 of the disk array system 500. Through the wirings of the backboards 20 and 20B, each of the components is mutually connected. In the basic chassis 100, the HDDs 31 of the plurality of HDD modules 30, duplex battery modules 50, and a panel 60 are connected to the front surface of the backboard 20 through the connectors. Further, the duplex CTL modules 10 and the duplex power source (PS) modules 40 are connected to the rear surface of the backboard 20. In the expanded chassis 200, the HDDs 31 of the plurality of HDD modules 30 are connected to the front surface of the backboard 20B through the connectors. Further, the duplex ENC modules 70 and duplex power source modules 80 are connected to the rear surface of the backboard 20B.

The SW18 of the CTL 110 (the bridge 12 and others are omitted here) and the SW19 of the ENC 170 have the SAS expander (EXP) 21 corresponding to the EXP function and the environment management unit (K) 22 corresponding to the environment management function. Between the chassis, the connection between the EXPs 21 is made by a communication cable and the like. Incidentally, the configuration in which the environment management unit (K) 22 is located at positions other than the SW18 and SW19 is also possible.

The EXP 21, based on a control from the high order disk I/F 16, controls the data input and output accesses and the path switching and others to the HDD 31 group of each chassis by the SAS interface.

The environment management unit (K) 22, based on a control from the high order (CPU 11 and others), monitors and detects a state of the power source unit (41 and the like), the fan unit (42 and the like), the HDD 31 and the like installed in the chassis and performs the control of the power source system and the fan control using the fan unit (42 and the like) through the backboard 20 and others.

The power source module 40 comprises a power source unit 41 and a fan unit 42. The power source unit 41, based on an AC input, converts AC into DC by an AC/DC conversion unit 411 and outputs DC power to the backboard 20 from a DC output unit 412. The DC power is supplied to each component through the circuit of the backboard 20. The fan unit 42 comprises a plurality of fans 43. The DC power (driving voltage) is inputted to the fan unit 42 from the power source 41 and others and the fans 43 are rotated.

The power source module 80 on the expanded chassis 200 side has basically the same configuration (layout, cooling structure and the like are different) as the power source module 40 on the basic chassis 100 side, and it comprises a power source unit 81, a fan unit 82 (a plurality of fans 83) and others.

<Power Source System>

Figure 3:
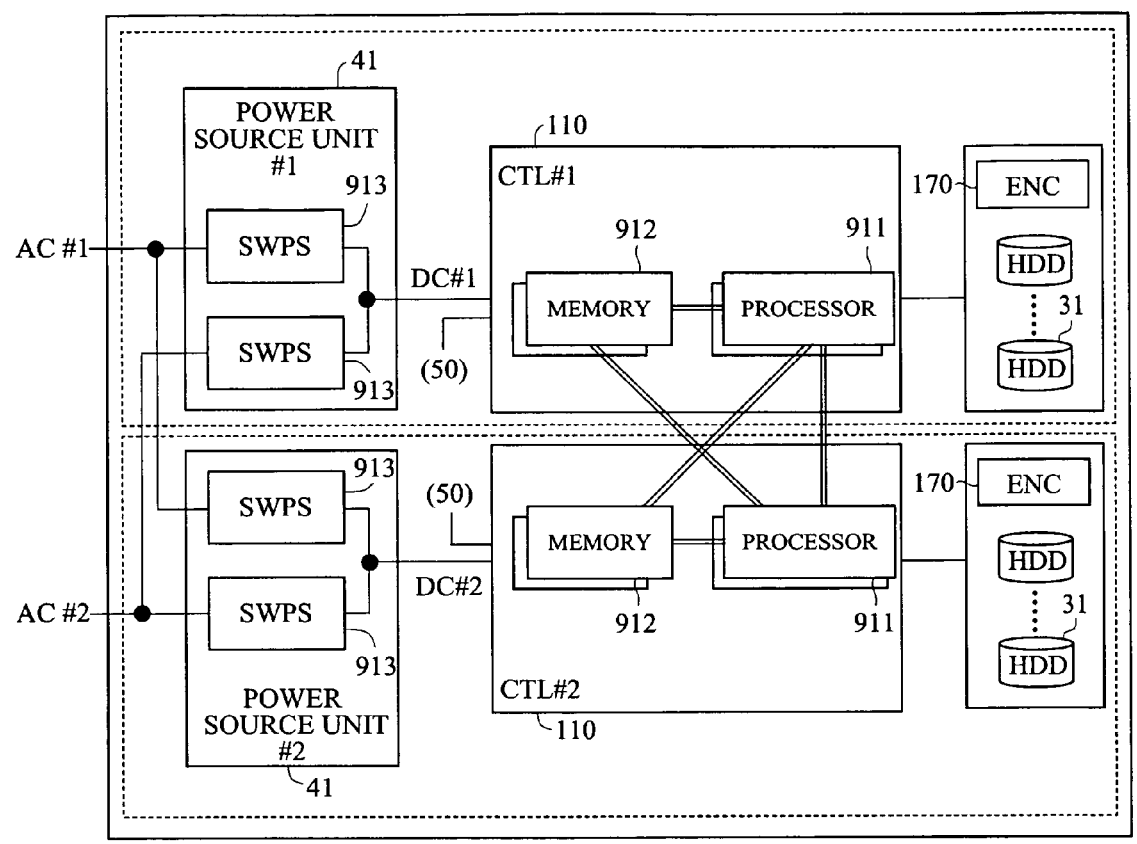
FIG. 3 is a diagram schematically showing a configuration of a power source system in the disk array system of the present embodiment.

The configuration of the power source system of the disk array system 500 will be described with reference to FIG. 3. This is the configuration of the power source of two systems corresponding to the duplex structures of the CTL 110, ENC 170, and HDD 31 group. The power source unit 41 (#1 and #2) in each power source module 40 (or 80) has a redundant configuration comprising two switching power sources (SWPS) 913 (corresponding to 411). This power source unit 41 generates DC outputs (DC#1 and #2) based on two AC inputs (AC#1 and #2), respectively, and outputs them to each component such as the corresponding CTL 110 and the like.

In each CTL 110, each processor 911 (CPU 11 and the like) can refer not only to the memory 912 (CM 17 and the like) on its own side (for example, #1) but also to the processor 911 and the memory 912 in the CTL 110 of the other side (for example, #2). The read/write of the data, the control information and others can be mutually performed between the duplex CTLs 110 so that no problem occurs even when one of them is in trouble.

The DC output is supplied also to components such as the ENC 170, HDDs 31, and the like from the corresponding power source unit in the same manner. When the DC supply is cut off, the DC output is supplied from the battery module 50.

The battery module 50 corresponds to UPS (uninterruptible power source unit), and it contains a plurality of batteries and supplies an emergency power source. When the power supply is stopped due to the power outage and the like, the battery module 50 supplies necessary power to prevent the data loss and the like at the power outage. More specifically, the battery module 50 supplies at least the power required until the data of the memory 912 (CM17 and the like) is written in the HDD 31 by the processor 911 of the CTL 110 and a premeditated stop is automatically executed and completed. As a result, the data loss at the time of the power outage can be prevented.

<Chassis>

Next, the external configuration of the entire hardware of the chassis of the disk array system 500 will be described with reference to FIG. 4 to FIG. 9 and others. The basic chassis 100 and the expanded chassis 200 have a predetermined size which is mountable on a rack (frame) with a size in conformity to the predetermined standard. The size of the basic chassis 100 is Width: X1 (about 483 mm), Depth: Y1 (about 656 mm), and Height: Z1 (4 U, about 172 mm). The size of the expanded chassis 200 is Width: X1, Depth: Y1, and Height: Z2 (3 U, about 127 mm). For example, the rack (not shown) has a box shape with openings in its front and rear surfaces, and each chassis (100 and 200) can be mounted up and down therein.

The modules to be installed in each of the chassis include various types of modules in the present embodiment, for example, the CTL module 10, the HDD module 30, the power source module 40, the battery module 50, the ENC module 70, and the power source module 80. In the installation of the HDD module 30 to the chassis, the hot plug is enabled. Operations such as insertion/removal and fixation of each module to and from the chassis (100 and 200) by a person are performed by using an operation lever 5 and the like provided in the module. The operation of the HDD module 30 is performed by using a handle 301 and the like.

Each chassis is made of metal in general and has a box shape, and can be disassembled by screws and others. A partition plate and the like which correspond to the area to which each module is installed are provided in the chassis. Further, an outer wall (main body) and the partition plate of the chassis are provided with the structure for the operations of insertion/removal and fixation of the modules, for example, a guide rail (structure of grooves, protrusions, and the like) and a receiving portion of the operation lever 5 (structure for receiving a latch portion 6 and a hook portion 7 of the operation lever 5). Further, the partition plate has a function to adjust the flow of the cooling air in addition to the function of fixation, reinforcement, and the like. Incidentally, the duplex two modules have the same configuration and are configured to be attachable to both of the two mounting areas in the chassis.

<Basic Chassis>

Figure 4:
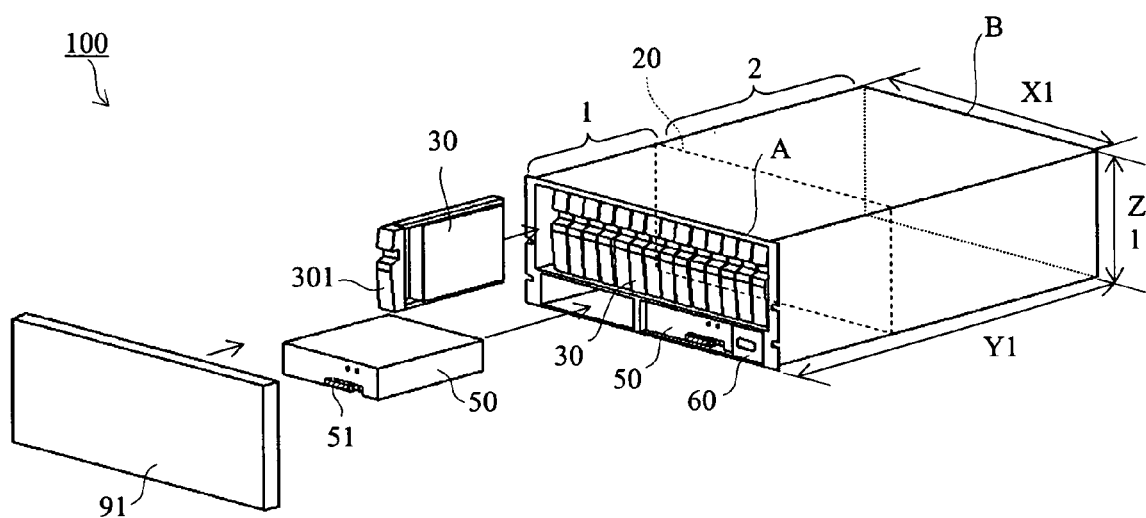
FIG. 4 is a perspective view showing a hardware configuration of the basic chassis seen from a side of a front surface (A)

A hardware configuration of the basic chassis 100 will be described with reference to FIG. 4 and FIG. 5. FIG. 4 is a diagram showing the configuration seen from the side of the opening of the front surface (A) of the basic chassis 100, and FIG. 5 is a diagram seen from the side of the opening of the rear surface (B) of the basic chassis 100.

In FIG. 4, the basic chassis 100 has openings in the front surface (A) and the rear surface (B) thereof, and the chassis is divided into a front part 1 (front side space) and a rear part 2 (rear side space) by the backboard 20 attached to the position at the midpoint in the chassis as a boundary.

In the front surface (A) of the front part 1 of the basic chassis 100, a plurality of HDD modules 30 can be installed to the upper side area thereof. Further, two battery modules 50 and the panel 60 can be installed to the lower side area thereof. A bezel (door) 91 having an air permeability can be attached to the front surface (A) in a state where each module is installed.

Figure 5:
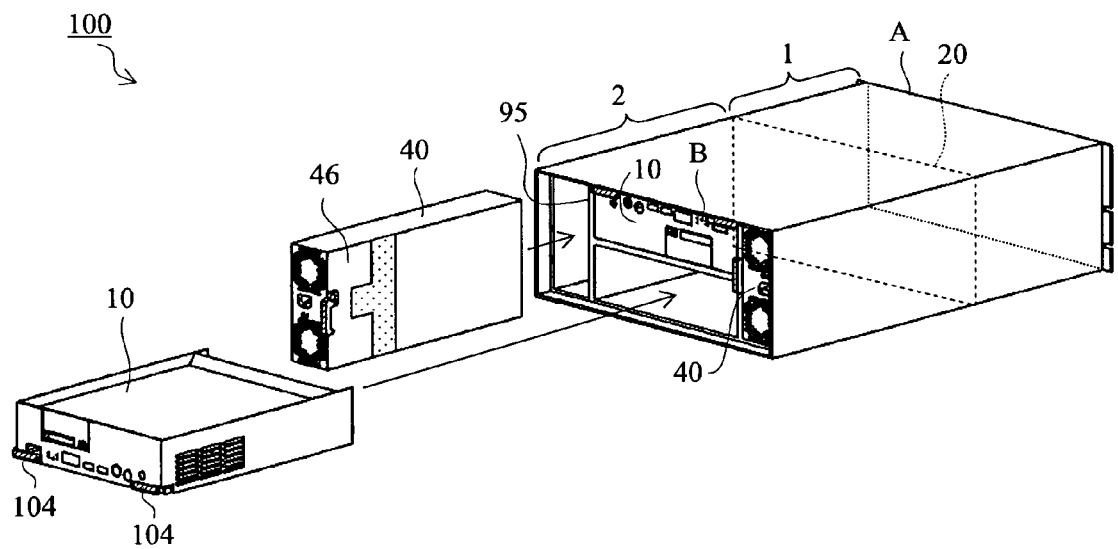
FIG. 5 is a perspective view showing a hardware configuration of the basic chassis seen from a side of a rear surface (B)

In FIG. 5, the rear surface (B) of the rear part 2 of the basic chassis 100 has the configuration to which two CTL modules 10 and two power source modules 40 can be installed. The two power source modules 40 are installed in the left and right side areas of the rear surface (B) of the rear part 2, and the two CTL modules 10 are installed in the areas sandwiched between these power source modules.

<Expanded Chassis>

Figure 6:
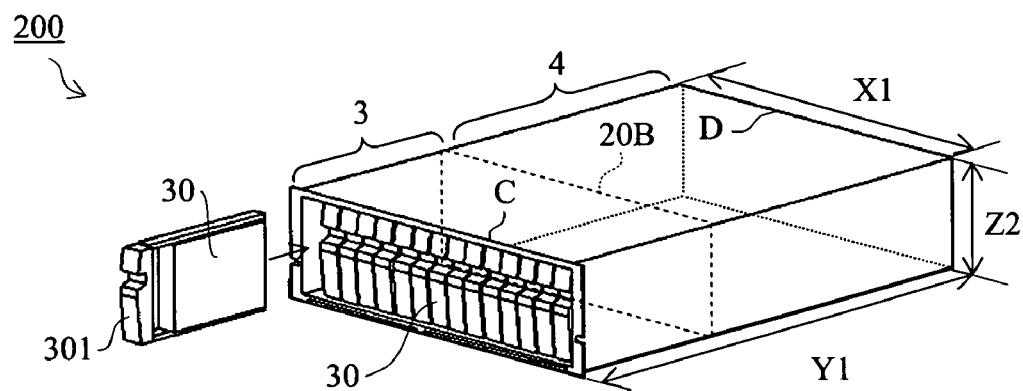
FIG. 6 is a perspective view showing a hardware configuration of the expanded chassis seen from as side of a front surface (C)

A hardware configuration of the expanded chassis 200 will be described with reference to FIG. 6 and FIG. 7. FIG. 6 shows a configuration of the expanded chassis 200 seen from the side of the opening of the front surface (C), and FIG. 7 shows a configuration of the expanded chassis 200 seen from the side of the opening of the rear surface (D).

In FIG. 6, the expanded chassis 200 has the openings in the front surface (C) and the rear surface (D) thereof, and the chassis is divided into a front part 3 (front side space) and a rear part 4 (rear side space) by the backboard 20B attached to the position at the midpoint in the chassis as a boundary.

In the front surface (C) of the rear part 3 of the expanded chassis 200, the plurality (15 sets) of HDD modules 30 can be installed in a state aligned in a lateral direction.

Figure 7:
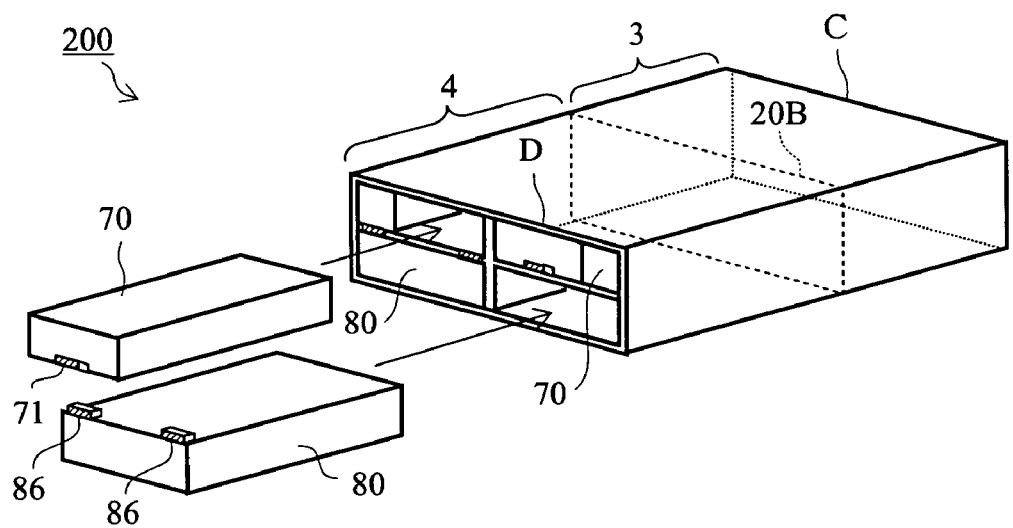
FIG. 7 is a perspective view showing a hardware configuration of the expanded chassis seen from a side of a rear surface (D)

In FIG. 7, the rear surface (D) of the rear part 4 of the expanded chassis 200 has the configuration to which two ENC modules 70 and two power source modules 80 can be installed. The duplex ENC modules 70 are disposed side by side in an upper central area of the rear surface (D) of the rear part 4, and the duplex power source models 80 are disposed side by side in an area below them.

<Basic Chassis—Front and Rear Surfaces>

Figure 8A:
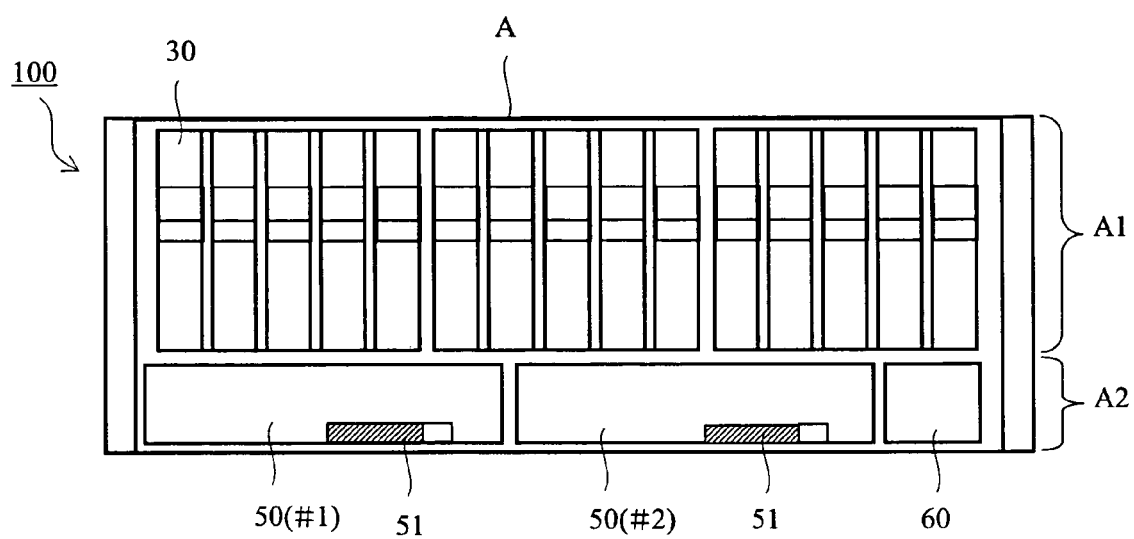
FIG. 8A is a diagram showing a configuration of the front surface (A) of the basic chassis.

Next, FIG. 8A shows a configuration of the front surface (A) of the basic chassis 100. In the front part 1, a plurality (up to 15 sets in the present embodiment) of HDD modules 30 in an upright position are installed in a relatively wider upper area (A1) in a state aligned in a lateral direction. Two battery modules (#1 and #2) 50 in a horizontal position are installed side by side in a relatively narrower lower area (A2), and the panel 60 is installed adjacent to the battery module, that is, in the lower right corner area of the front surface (A). The panel 60 is a unit to display basic operations and states such as ON and OFF of the power source in the system. The boundary between the upper area (A1) and the lower area (A2) is provided with a partition plate. The operation lever 51 is provided at one position of the lower side of the battery module 50.

Figure 8B:
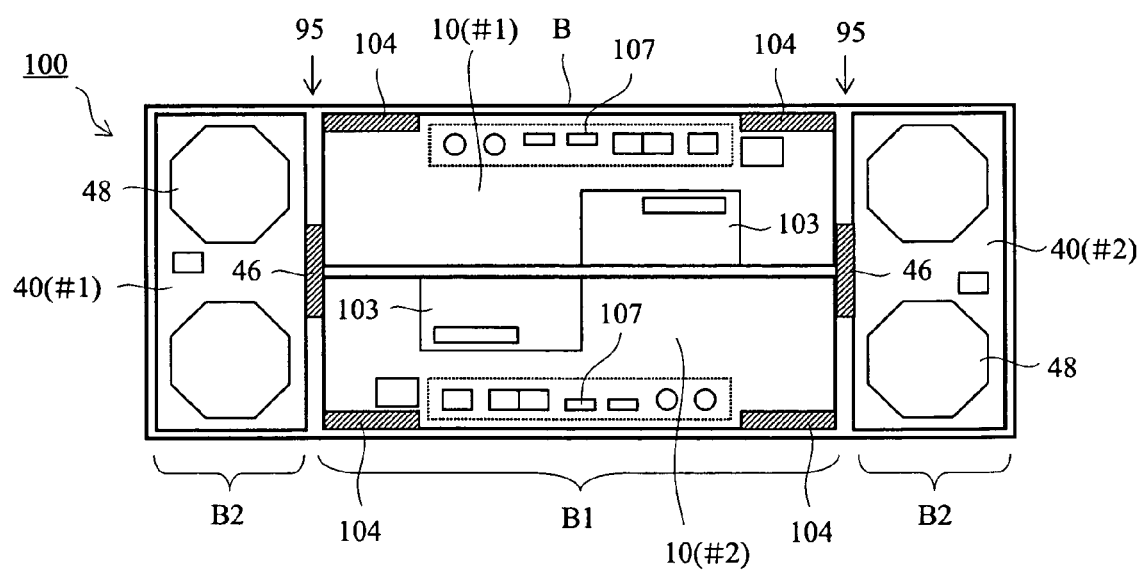
FIG. 8B is a diagram showing a configuration of the rear surface (B) of the basic chassis.

FIG. 8B shows a configuration of the rear surface (B) of the basic chassis 100. In the rear part 2, the power source modules (#1 and #2) 40 in an upright position are installed in the areas (B2) close to the left and right sides of the rear surface (B). Two CTL modules (#1 and #2) 10 in a horizontal position are installed up and down in the intermediate area (B1) sandwiched between the power source modules. The same two CTL modules 10 are installed upside down relative to each other. The same two power source modules 40 laterally reversed to each other are installed.

The partition plate 95 is provided at the boundary between the side surface of the power source module 40 and the side surface of the CTL module 10. A partition plate is provided at the boundary between the upper and lower two CTL modules 10.

A surface of a host I/F unit 103 corresponding to the host I/F 14 and an area 107 of various types of terminals are provided in a part of the front surface (106) of the CTL module 10. Two operation levers 104 are provided at the left and right corners on one side of the front surface (106) of the CTL module 10, and the insertion/removal and the fixation of the CTL module 10 by the two operation levers 104 can be performed.

An exhaust hole 48 and the like corresponding to the positions of the exhaust ports of a power source switch and a fan 43 are provided in the front surface of the power source module 40. One operation lever 46 is provided close to the center of one side surface of the power source module 40.

<Expanded Chassis—Front and Rear Surfaces>

Figure 9A:
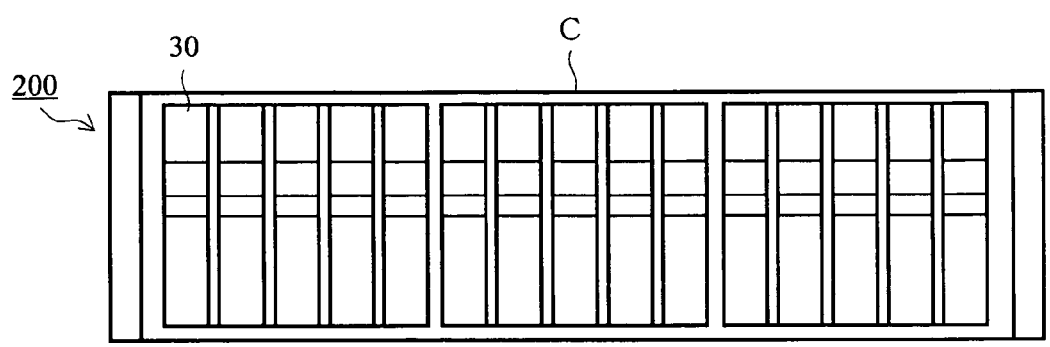
FIG. 9A is a diagram showing a configuration of the front surface (C) of the expanded chassis.

FIG. 9A shows a configuration of the front surface (C) of the expanded chassis 200. A plurality (up to 15 sets) of HDD modules 30 are installed into the entire area of the front part 3 in a state aligned in a lateral direction.

Figure 9B:
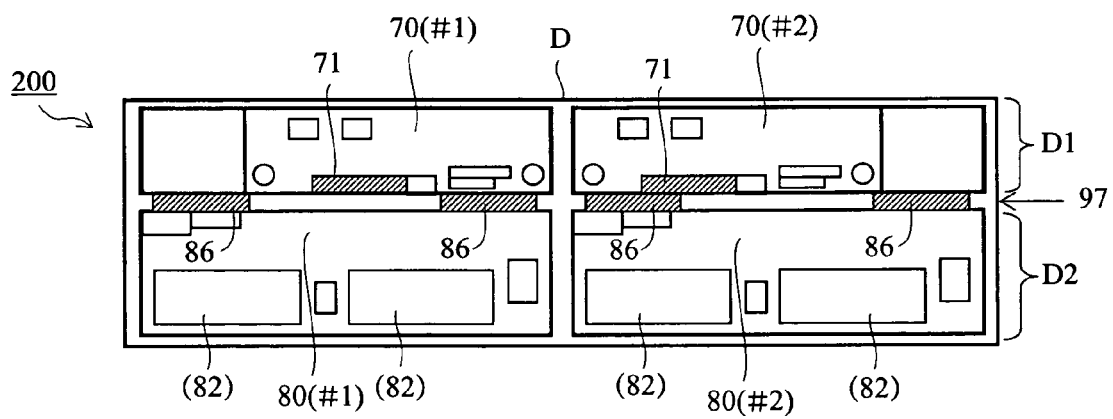
FIG. 9B is a diagram showing a configuration of the rear surface (D) of the expanded chassis.

FIG. 9B shows a configuration of the rear surface (D) of the expanded chassis 200. In the rear part 4, two ENC modules 70 in a horizontal position are installed side by side in an upper central area (D1) of the rear surface (D). Two power source modules 80 in a horizontal position are installed side by side in the lower area (D2). The two ENC modules 70 and the two power source modules 80 are oriented in the same direction.

The partition plate 97 is provided at the boundary between the upper ENC module 70 and the lower power source module 80. A partition plate is provided between the left and right modules. One operation lever 71 is provided at the middle of a lower side of the front surface of the ENC module 70.

The ventilation hole and the like corresponding to the positions of the exhaust ports of a power source switch and a fan (82) are provided in the front surface of the power source module 80. Two operation levers 86 are provided at the upper left and right sides of the power source module 80.

<Basic Chassis-Horizontal Surface>

Figure 10:
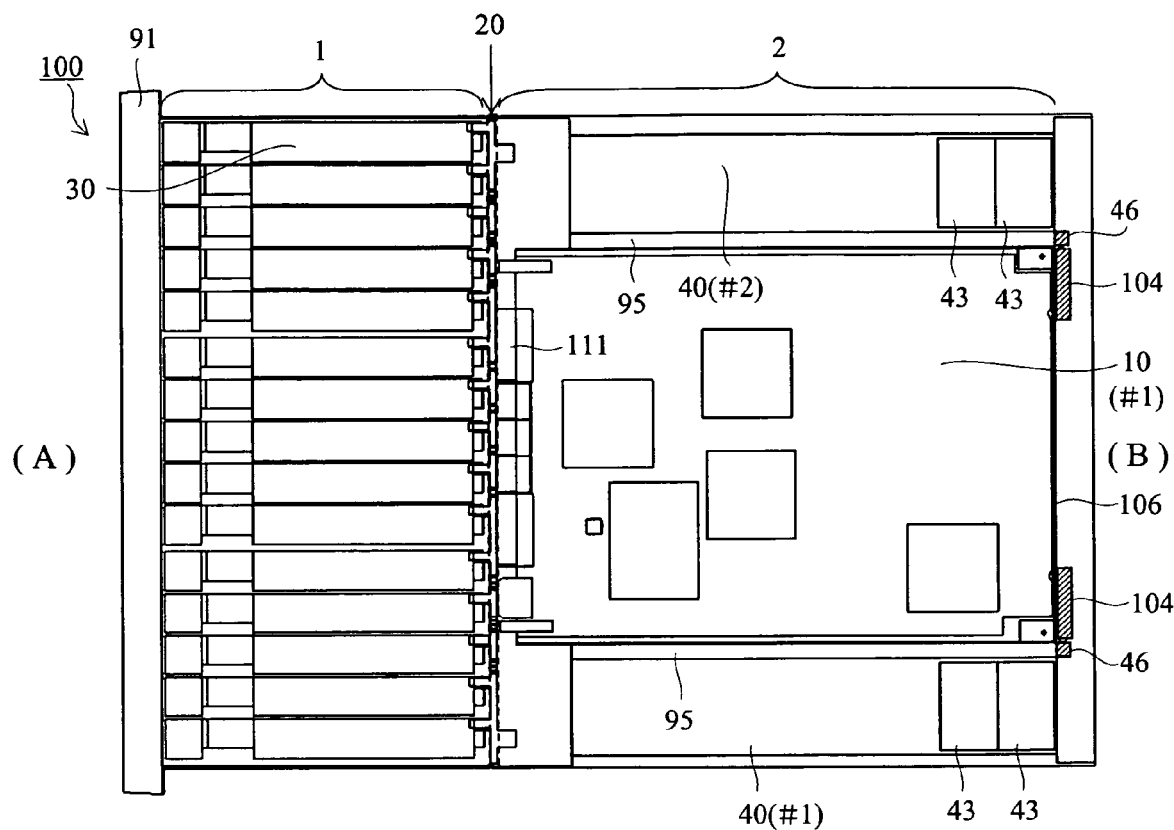
FIG. 10 is a diagram schematically showing a planar structure of the basic chassis in the horizontal direction.

Next, FIG. 10 shows a schematic horizontal planar configuration (corresponding to the section of one CTL module 10 seen from above) of the basic chassis 100. The front part 1 has the HDD modules 30, and the rear part 2 has the CTL module 10 and the two left and right power source modules 40. Two fans 43 as a fan unit 42 are provided in a row in a back-and-forth direction on the rear side of the power source module 40. A lever main body (9) of the operation lever 104 is disposed on the front surface 106 side of the CTL module 10. A part (screw fixing portion 8 and hook portion 7) of the operation lever 104 is disposed in a recessed portion (notched portion) at the corner of the front surface 106 of the CTL module 10, and a receiving portion (157) thereof is provided at a corresponding position of the partition plate 95. The lever main body (9) of the operation lever 46 of the power source module 40 is disposed on the side of the chassis rear surface (B) of the partition plate 95 between the CTL module 10 and the power source module 40, and the corresponding receiving portion (156) is provided.

<Basic Chassis-Vertical Surface>

Figure 11:
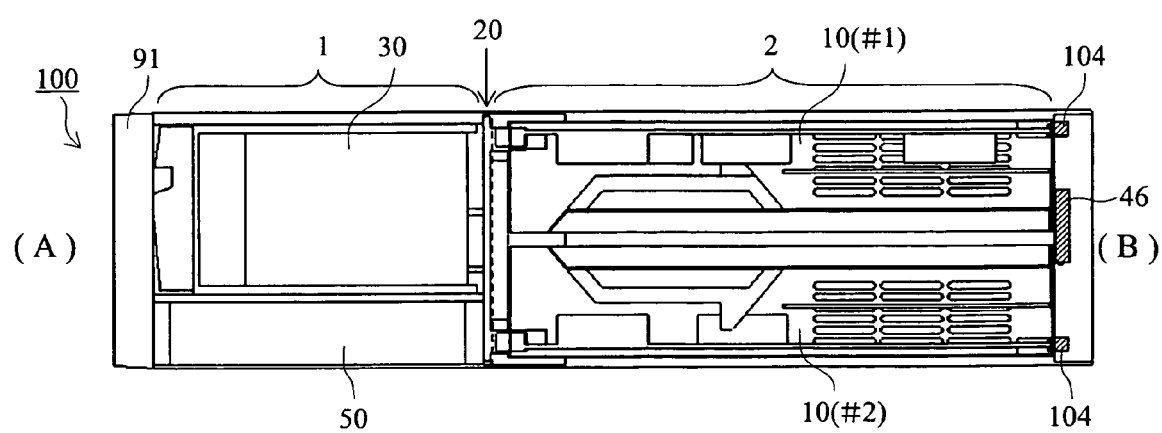
FIG. 11 is a diagram schematically showing a planar structure of the basic chassis in vertical direction (side surface)

FIG. 11 shows a schematic vertical planar configuration (corresponding to the section of the CTL module 10 seen from the side thereof) of the basic chassis 100. In the front part 1, the HDD module 30 is installed on the upper side, and the battery module 50 is installed on the lower side. In the rear part 2, two CTL modules 10 are installed up and down. The lever main body (9) of the operation lever 104 of the CTL module 10 is disposed near the upper and lower sides of the chassis rear surface (B). The lever main body (9) of the operation lever 46 of the power source module 40 (not shown) is disposed near the center in the vertical direction of the chassis rear surface (B).

<Basic Chassis-Backboard Surface>

FIG. 12 shows the surface (front surface) of the backboard 20 in the basic chassis 100. The backboard 20 is a circuit board with a roughly flat planar shape and is fixed to a frame part positioned at the middle and slightly close to the front side of the basic chassis 100. The backboard 20 electrically connects each of the modules through connectors and physically supports them. The fixation of the module mentioned here corresponds to the state in which the connector of the rear surface of the module and the corresponding connector of the backboard 20 are engaged and electrically connected.

A group of connectors (203, 205, and 206) for connecting the HDD module 30, the battery module 50, the panel 60, and the like are provided on the front surface of the backboard 20. A group of connectors (201 and 204) for connecting the CTL module 10, the power source module 40, and the like are provided on the rear surface of the backboard 20. Further, wiring patterns for the mutual connection between the connectors and openings (ventilation holes) 220 through which the cooling air is supplied from the front part 1 to the rear part 2 are provided in the backboard 20.

A plurality of connectors (HDD connectors) 203 for the connection of the HDD modules 30 with a longitudinal rectangular shape are disposed on a zone extending in a lateral direction near the center (center zone) of the backboard 20. Further, connectors (battery connectors) 205 for the connection of the battery modules 50 with a horizontal rectangular shape are disposed below the HDD connectors 203. Also, a connector (panel connector) 206 for the connection of the panel 60 is disposed near the lower right corner of the backboard 20.

Further, connectors (CTL connectors) 201 to be connected to the CTL modules 10 are disposed near the center of the upper and lower sides on the rear surface side of the backboard 20, while interposing the area of the HDD connector 203 therebetween. That is, on the upper side, the CTL connector 201 for the connection of the module (10) of a first CTL (#1) with a lateral rectangular shape is disposed. On the lower side, the CTL connector 201 for the connection of the module (10) of a second CTL (#2) is similarly disposed. Further, connectors (power source connectors) 204 for the connection of each power source module 40 with a longitudinal rectangular shape are disposed near the center of the left and right sides of the backboard 20.

<HDD Module>

Next, FIG. 13A and FIG. 13B show the HDD module 30 (also referred to as canister module). The HDD 31 is stored in the HDD module 30, and a connector 32 to be connected to the connector 203 on the backboard 20 is provided on the rear surface of the HDD module 30. A handle 301 is provided on the front surface of the HDD module 30, and the operation of insertion/removal and fixation of the HDD module 30 can be performed by this handle. The HDD module 30 has a uniform external appearance by the design of the handle 301 and the like. The HDD 31 of the HDD module 30 installable in the present embodiment is either the Serial Attached SCSI HDD (SAS-HDD) 31 shown in FIG. 13A or the Serial ATA (SATA) interface HDD (SATA-HDD) 35 shown in FIG. 13B.

In FIG. 13A, in consideration of the position of the connector 32 of the SAS-HDD 31 and the installing position of the HDD module 30, the connector position of each of other modules, the module installing position, and shape are designed. Between the duplex CTL 110 (disk I/F 16) and the SAS-HDD 31, the data input/output processing is performed by the "two-port and two-path (2P)" according to the SAS interface. The SAS-HDD 31 side has two ports (2P).

In FIG. 13B, when the HDD module 30 of the SATA-HDD 35 is to be installed, a path control board (I/F conversion board) 37 is interposed and connected between the connector 36 of the SATA-HDD 35 and the connector (203) of the backboard 20 so as to match with the position of the connector 32 of the SAS-HDD 31. More specifically, the connector 32 of the SAS-HDD 31 and the corresponding connector of the path control board 37 are connected, and the connector 38 of the path control board 37 and the corresponding connector (203) of the backboard 20 are connected. The SATA-HDD 35 has one port (1P). In the case of the connection of the SATA-HDD 35, the I/F conversion is performed by the SATA and the SAS by the control board 37 having the two ports.

<Power Source Module>

Figure 14A:
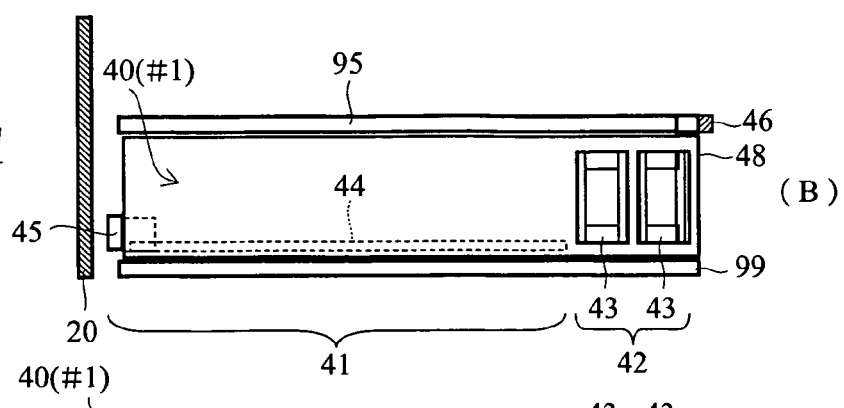
FIG. 14A is a diagram schematically showing a planar configuration of a power source module installed in the basic chassis and its periphery in the horizontal direction.
Figure 14B:
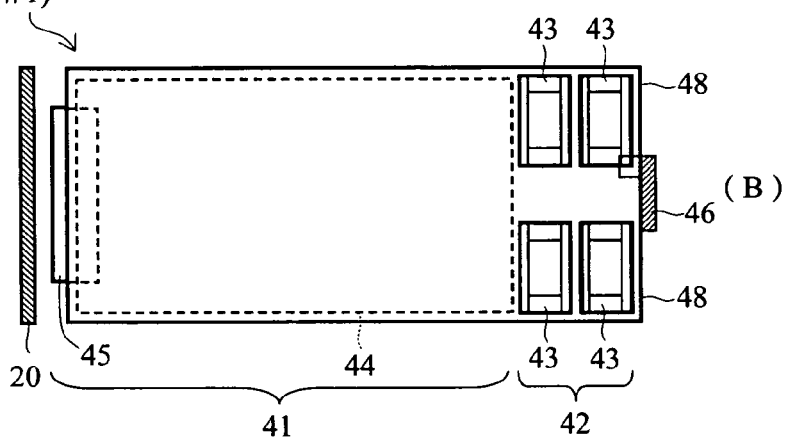
FIG. 14B is a diagram schematically showing a planar configuration of a power source module installed in the basic chassis and its periphery in the vertical direction (side surface)

In FIG. 14A and FIG. 14B, the power source module 40 has an integrated module configuration including the power source unit 41 and the fan unit 42, thereby reducing the size of the chassis. FIG. 14A shows a state in which one power source module 40 is installed between the outer wall 99 of the basic chassis 100 and the partition plate 95 in a horizontal plane. FIG. 14B schematically shows the state in a vertical plane (side surface).

The power source unit 41 comprises a substrate 44, and a connector 45 to be connected with the corresponding connector 204 of the backboard 20 is provided on the rear surface side of the power source module 40. The operation lever 46 is disposed on the side of the chassis rear surface (B) of the partition plate 95 and receiving portions (156, 157) corresponding thereto are provided in the partition plate. The operation lever 46 is disposed outside the external shape (box-like shape) of the power source module 40 (formed as a projected portion).

The fan unit 42 has a redundant configuration to cool the inside of the basic chassis 100 by the operation of a plurality of fans (air blowers) 43. In the present embodiment, the fan unit 42 is similarly provided with two fans 43 each in the upper and lower areas corresponding to the upper and lower two CTL modules 10, and further, it is provided with two (duplex) fans 43 aligned in a back-and-forth direction (in tandem). In this configuration, total of four fans 43 are provided in one power source module 40. As the fan 43, for example, a fan such as an axial-flow fan is used.

By a blade rotational motion by a DC power supply, each fan 43 takes air from an air-intake port facing the front surface (A) of the chassis and exhausts the air from the exhaust port facing the rear surface (B) of the chassis. By the operation of the fan 43, the cooling air is taken in from the air intake port, and then exhausted to the outside of the basic chassis 100 from the exhaust port in the back and the exhaust hole 48 of the power source module 40.

<CTL Module>

Figure 15:
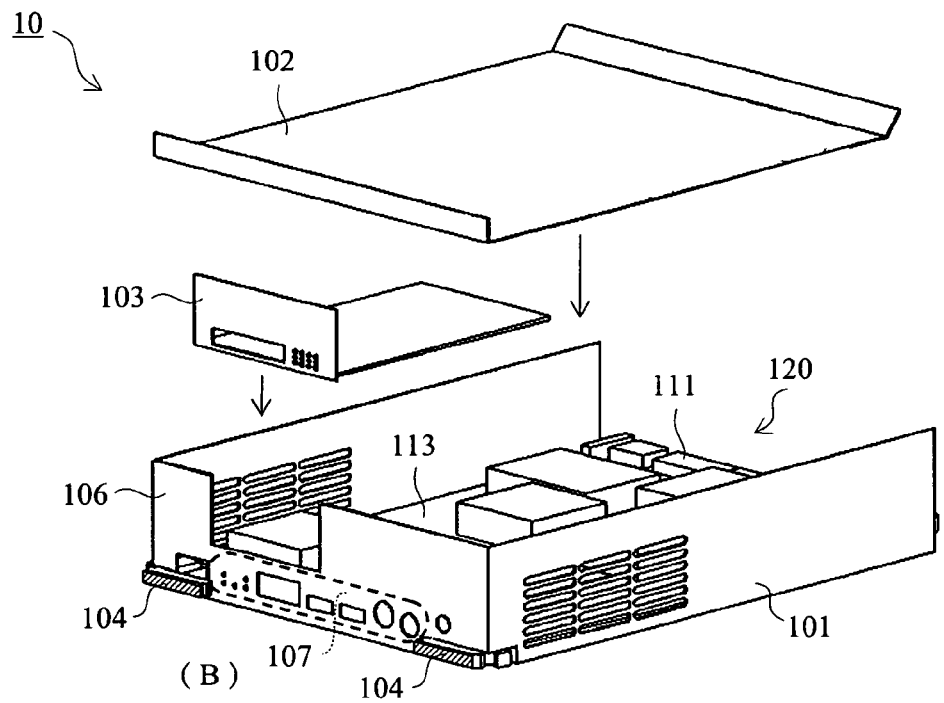
FIG. 15 is a perspective view showing a disassembled state of the structure of a CTL module installed in the basic chassis.

FIG. 15 shows a structure of the CTL module 10 in a disassembled state. After storing and connecting component parts such as a CTL substrate (control package) 120, a host I/F unit 103, and the like in a main body 101 of the CTL module 10, a top cover 102 serving as the upper surface is attached by screws and the like.

The CTL substrate 120 is attached to the inner bottom surface of the main body 101. The CTL substrate 120 generally has a plate-like shape formed of a substrate 113. A connector (BB connecting connector) 111 to be connected to the backboard 20 is provided on one side of the CTL substrate 120. Components such as an IC are mounted on the substrate 113. The main body 101 and the top cover 102 are package mainly formed of sheet metal constitute most of the external shape of the CTL module 10. The front surface 106 (the rear surface (B) side of the basic chassis 100) of the may body 101 has a notched area corresponding to the attachment of the host I/F unit 103. The host I/F unit 103 includes a substrate, a front panel, terminals and others. The connector 111 and the like of the CTL substrate 120 are exposed on the rear surface side of the main body 101.

Further, various terminals, display elements, and the like are mounted in a part of the area of the front surface 106 of the CTL module 10, particularly in an area 107 near the center of the lower side thereof. In this area 107, for example, a display LED, LAN terminal, backend system terminal, remote adaptor terminal, UPS terminal and the like are mounted.

Further, on the left and right sides of this area 107, that is, at the bottom left and right corners of the front surface 106, the operation levers 104 in a horizontal position are provided. In the mechanism of the operation lever 104, for example, the CTL module 10 is fixed and released to and from the chassis by the operation of rotating a rod-like lever main body (9) on a screw fixing portion 8 (fulcrum point) at the corner of the CTL module 10, that is, by the operation of moving up or down the lever main body (9) on the front surface 106 of the CTL module 10. When fixing the module, the lever main body (9) is put down so as to be in parallel with the front surface 106. By this means, its one end (side surface side) is hooked on the structure (receiving portion) on the side of the partition plate 95 of the chassis, and the other side (inner side) is latched on the structure (receiving portion 156) on the side of the front surface 106 of the CTL module 10.

<Example of Conventional Technology>

Next, for comparison purpose, a configuration (chassis, module and operating structure) in the disk array system of the conventional technology (background technology) of the present embodiment will be briefly described below. In this conventional technology, in the basic chassis, modules such as the HDD group, the battery, and the like are installed in the front part, that is, on the front surface side from the backboard. Also, three types of modules such the CTL, power source, and fans and duplicated modules thereof, that is, a total of six modules are installed in the rear part, that is, on the rear surface side from the backboard. In the rear part, two CTL modules are adjacently disposed up and down in the upper area, and two power source modules are adjacently disposed side by side in the lower area. Two fan modules are disposed on both left and right sides of these modules. That is, in this configuration, power source module and fan module are separated. The HDD is, for example, a HDD of a fiber channel I/F. Further, in the expanded chassis, the modules of the HDD group are installed in the front part, that is, on the front surface side from the backboard. Two types of modules of the ENC and the power source and duplicated modules thereof, that is, a total of four modules are installed in the rear part, that is, on the rear surface side from the backboard. In the rear part, two ENC modules are adjacently disposed side by side in the upper area, and two power source modules are adjacently disposed side by side in the lower area.

The operating structures of these modules are different in each module (for example, CTL module, power source module) due to a difference in the mounting structure of the system chassis and modules. For example, some modules are connected directly, some modules are mounted by fixing its lever with screws using a screw driver, and some modules are mounted with a locking bar.

<Design of Basic Chassis and Module>

The outline of the design for the basic structure of the basic chassis 100 and the layout of each module in the chassis will be shown in the following (1) to (4). Basically, based on the mounting details of the modules, required specifications, and the like, the shape, size, layout, and the like of the module are designed considering the prevention of the interference between the connectors in the backboard 20 and the cooling structure in the chassis and the size reduction thereof (size standard and the like). With respect to the connector interference, the design is made so that the positions of the connectors to connect each module do not overlap one upon another and they are not located too close in the front and rear surfaces of the backboard 20.

(1) The layout of the HDD modules 30 is determined. Since the specification basically requires the mounting of the SAS-HDD 31, the position of the connector 32 on the side of the HDD 31 of the HDD module 30 and the position of the corresponding connector 203 on the side of the backboard 20 are determined. Specifically, the positions of the connectors (32 and 203) are located in the center zone of the backboard 20 as shown in FIG. 12 and FIG. 13. Further, in the front part 1, the battery module 50 and the like are disposed below the HDD module 30, and the configuration of the front part 1 is thus roughly determined. Also when the SATA-HDD 35 is installed, because of the interposition of the path control board 37, the chassis has approximately the same configuration as the case of SAS-HDD 31 in its entirety. By the change in the specification from the conventional configuration, the position of the connector 32 of the SAS-HDD 31 for the backboard 20 of the present configuration differs from the conventional position of the connector of the HDD of the fiber channel I/F for the backboard (moved from upper area to the center zone).

(2) The layout of the CTL module 10 is determined. The position of a connector 111 of the CTL module 10 and the position of the corresponding connector 201 on the backboard 20 are determined so as to prevent the connector interference in the backboard 20, in particular, to prevent the overlap with the position of the connector 32 of the HDD module 30 of the item (1). Specifically, the positions of the connectors (111 and 201) are located at the positions near the upper and lower sides of the backboard 20 as shown in FIG. 12 and FIG. 13. In the conventional configuration, the two power source modules are disposed below the two CTL modules (#1 and #2), and the connector of one CTL module (#2) is disposed near the center of the backboard. In the present configuration, in the rear part 2, the conventional two power source modules are moved to the left and right side areas (power source module 40), and two CTL modules (10) only are adjacently disposed up and down in the area between the power source modules. By this means, the position of the connector of one (lower side) CTL module (#2) is moved further downward than the conventional position.

(3) The layout of the power source module 40 is determined. According to the item (2), though the power source modules 40 are disposed in the left and right side areas (B2) of the chassis, since the fan modules exist in these areas in the conventional configuration, the power source modules 40 are integrated with the fan modules. More specifically, this power source module 40 is a combination type containing the power source unit 41 and the fan unit 42. Further, the positions of the connector 45 of the rear surface of the power source module 40 and the corresponding connector 204 on the backboard 20 are determined so as to prevent the connector interference. Specifically, the positions of the connectors (45 and 204) with a longitudinal rectangular shape are located near the left and right sides of the backboard 20 as shown in FIG. 12. The connectors of the power source module of the conventional configuration are disposed near the lower side of the backboard. In the present configuration, however, these connectors are unified with connectors of the left and right fan modules and are moved to the positions near the left and right sides of the backboard 20. In this manner, the configuration of the rear part 2 is roughly determined.

(4) Next, the structure of the flow path of the cooling air from the front surface (A) of the front part 1 to the rear surface (B) of the rear part 2 of the basic chassis 100 through the backboard 20 is considered and designed. The layout and size distribution of the module mounting area in the chassis, the layout of the partition plate and ventilation hole, the layout, area, and the like of the opening hole 220 of the backboard 20 are considered and designed.

<Design of Operation Lever>

The configuration of the operation lever 5 will be described based on the configuration of the disk array system 500 described above. The design of the common operation lever 5 in this disk array system 500 is outlined as follows.

(1) The modules to which the operation lever 5 is provided include five types of modules, that is, the CTL module 10, the power source module 40 and the battery module 50 of the basic chassis 100 and the ENC module 70 and the power source module 80 of the expanded chassis 200. The plurality of HDD modules 30 are excluded from the object for consideration because there occurs no problem in operability if a structure such as its own handle 301 is provided. As the operation lever 5, the two operation levers 104 of the CTL module 10, the operation lever 46 of the power source module 40, the operation lever 51 of the battery module 50, the operation lever 71 of the ENC module 70, and the two operation levers 86 of the power source module 80 are provided.

(2) If the structure of the chassis and module is considered in the design of the common operation lever 5 for the modules, the force necessary for the operations of insertion/removal and fixation of the modules (connector coupling) is largest in the CTL module 10 among the various modules. Accordingly, the structure of the operation lever 104 to be provided to the modules is determined based on the CTL module 10 of the basic chassis. Then, the structure and method of the operation lever 104 are applied to other modules (40, 50, 70, and 80) in common, that is, all the object modules are provided with the common operation lever 5.

In the CTL module 10, the CTL substrate 120 is mounted and its rear surface is connected to the backboard 20 through a connector. That is, the connector 111 on the rear surface side of the CTL module 10 is coupled with the corresponding connector 201 on the backboard 20. The force necessary for the operation (operation force) of the CTL module 10 is estimated from the force necessary for the connector connection (connector coupling force). Accordingly, the operation lever 104 to be provided to the CTL module 10 is designed. In one CTL module 10, for example, two same operation levers 104 are required because a relatively large operation force is applied.

(3) The detailed configuration of the operation levers 5 to be provided to various object modules (10, 40, 50, 70, and 80) including the operation lever 104 provided to the CTL module is determined. Since the installation area, connector coupling force and detailed requirement for mounting in the chassis differ depending on each module, the difference in the configuration of the operation levers 5 for each module, for example, the number of arranged levers, position and mounting method thereof is determined in detail in accordance with the differences. As for the number of the operation levers to be arranged, an operation lever is arranged if the necessary operation force is satisfied or two levers are arranged if the operation force is insufficient. The arrangement position is a position exposed on a side of an opening of the chassis (front surface or rear surface) in consideration of the positions of the connectors for the connection to the backboards 20 and 20B. As for the mounting method of the operation lever, the operation lever is disposed and mounted inside (in a recessed portion) or outside (on a projected portion) the module area which is substantially box-shaped in its external shape, and alternatively, the receiving portion for the component of the operation lever 5 is provided in the form of an internal mounting portion (recessed portion) or an external mounting portion (projected portion) in an area (wall or others) of the chassis or the module.

<Basic Structure of Operation Lever>

Figure 16:
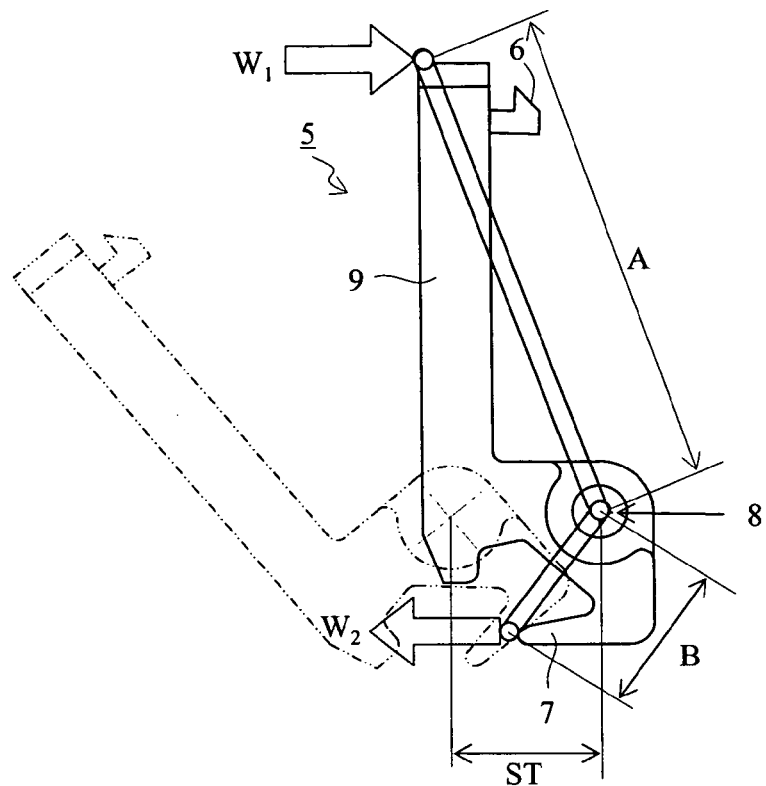
FIG. 16 is a diagram showing the basic structure of an operation lever.

FIG. 16 shows the basic structure of the operation lever 5. The operation lever 5 is a latch-type lever having a mechanism using the principle of leverage and constituted of a lever main body 9, a screw fixing portion (rotary shaft portion) 8, a latch portion (fixed latch portion) 6, a hook portion 7, and others. One or more operation levers 5 are attached at each predetermined position of a module in consideration of a force (operation force) necessary for the operation of the module. The lever main body 9 can be moved down or up with respect to the module surface by the rotary shaft portion 8. The latch portion 6 is fixed to the structure of the receiving portion on the chassis side or the module side by the latch action when the module is fixed. The hook portion 7 is fixed to the structure of the receiving portion on the chassis side when the module is fixed.

<Design of Operation Lever Arrangement>

Figure 17:
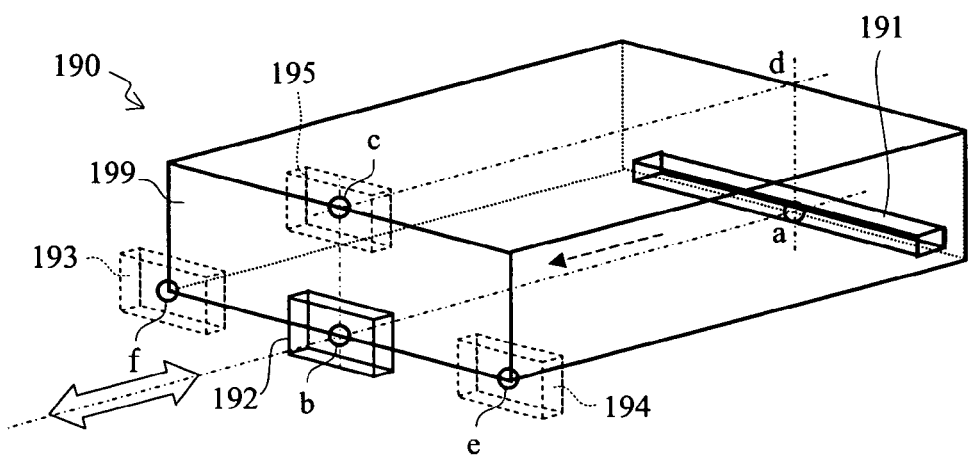
FIG. 17 is a schematic diagram for describing the basis of the design of arrangement (mounting positions) of the operation lever to the module.

The basis of the design of the arrangement (mounting position) of the operation lever 5 with respect to the module will be described below with reference to FIG. 17. The basic concept for determining a preferred arrangement of the operation lever 5 in the module will be described. The arrangement position of the operation lever 5 to the module is determined based on a balance of the connector connection force between the module and the backboards 20 and 20B. More specifically, in the operation for insertion/removal and fixation of the module by the operation lever 5, it is required that the lever can bear a sufficient force. FIG. 17 shows an example of the position of the connector 191 to be connected to the backboard 20/20B in an object module 190 substantially rectangular in its external shape (lower side of the rear surface of the module 190), and it also shows an example of the positions (points b, c, e, f, etc.) at which the operation lever 5 is to be disposed and the operation lever arrangement area (areas 192 to 195). The respective areas 192 to 195 indicate a range in which the object areas for arrangement and installation of the operation lever 5 can be contained. The detailed mounting position in the areas 192 to 195 is determined considering the mounting structure nearby.

More specifically, the mounting position is determined as follows. Basically, it is determined considering the operation force based on the connector coupling force with the backboards 20 and 20B. Arrows indicate the direction in which an operation force works when the module 190 is inserted or removed. As an ideal position, the lever is disposed at a symmetrical position with respect to the center position of the connector 191 (for example, in case where the connector 191 is located on the lower side of the rear surface) to be connected to the backboards 20 and 20B of the rear surface of the object module 190. That is, on the surface seen from above where the connector 191 is disposed (lower surface of the module 190), the ideal position is the point b defined by an extension line (a-b) from a center position (point a) of the connector 191 on the rear surface to its corresponding position (point b) on the front surface 199 of the module 190 on an opposite side. It is ideal to dispose the hook portion 7 (point of action) of the operation lever 5 at this position (point b). When one operation lever 5 is disposed in the area 192 of this position (point b) and the condition for the operation force is satisfied, the structure is preferable.

In addition to the description above, the area in which the operation lever 5 is to be disposed is required not to interfere with an area of any mounting components of the module 190 and the chassis corresponding to the module 190. The structure in which the operation lever is arranged at the ideal position (point b, area 192) is difficult in some cases because of detailed requirement of the installation. For example, when an area in which a necessary component is mounted is present near the point b and the mounting space of the operation lever 5 cannot be secured, it is difficult to use the structure described above. In such a case, the operation lever is disposed at a position shifted from the ideal position to its surrounding.

For example, the operation levers 5 are disposed at symmetrical positions (area 193 of the point e, area 194 of the point f) on the right and left sides of the ideal position (point b) on the front surface 199 of the module 190, and a single operating function is borne by the two operation levers 5. Unless the necessary operation force can be given by a single operation lever 5, two or more operation levers 5 are disposed at symmetrical positions such as the right and left positions as described above. Note that it is inappropriate to arrange or mount only one of these two operation levers 5 in view of the balance of force.

Further, a next preferable position to the ideal position (point b) is not limited to the right and left positions but may be at a position on an extension line (b-c) extending in a vertical direction from the point b on the front surface 199, in particular, it may be an area 195 of the point c. In other words, it may be a position (point c) existing on a section including the center position (point a) of the connector 191 in the direction of the side surface of the module (a-b-c-d) and farther from the center point (point a) of the connector 191 on the rear surface than the ideal position (point b).

Further, the detailed arrangement and mounting structure of the operation levers 5 are determined considering the detailed structure of the module 190 and the structure of the chassis adjacent to the module. For example, the direction of the operation lever 5 (vertical and horizontal arrangement, arrangement on the front surface of the module or arrangement on the side surface of the module) is determined. Further, for example, the operation lever is disposed and mounted in a recessed portion (internal part) or on a projected portion (external part) of an area of the module 190. Also, the internal arrangement in the case where the notched portion (recessed portion) exists in the area of the module 190 or the external arrangement in the case where such notched portion does not exist can be selected. The chassis has the receiving portion (156, 157) which is a structure to receive a part (latch portion 6 or hook portion 7) of the operation lever 5. As such a structure, for example, there are structures of the recessed portion (internal part) and projected portion (external part). As the structure of the receiving portion (156) of the latch portion 6, for example, provision of a hole in the outside wall of the module or attachment of a recessed component is available. As the structure of the recessed portion (internal part) of the receiving portion (157) of the hook portion 7, for example, provision of a hole in the plate metal (outside wall or partition plate) of the chassis or attachment of a recessed component is available. Further, as the structure of the projected portion (external part), attachment of a separate component (external attachment metal with screws) to the chassis or formation thereof directly to the chassis (plate metal) is available.

<Operation Force>

The operation force of the operation lever 5 will be described with reference to FIG. 16. An operation force necessary for the operation lever 5 is estimated and calculated for each module based on the arrangement position, number, and coupling force between the connectors (connector coupling force) in the module. The connector coupling force can be calculated from the capacity of power source, the number of signal lines and others. The operation force differs depending on each module in accordance with the differences in plural types of the modules. In the chassis and module structure of this disk array system 500, the operation force is largest in the CTL module 10 and becomes smaller in the order of the power source module 80 of the expanded chassis 200, the ENC module 70, the power source module 40 of the basic chassis 100, and the battery module 50. The condition for forming a plurality of operation levers in plural types of the modules is that one operation lever (one of two operation levers) of the CTL module 10 covers the operation force of one operation lever in other modules (the former is greater than the latter). By satisfying this condition, the operation lever can be used in common as a plurality of operation levers in the plural types of modules based on the operation lever 104 of the CTL module 10.

An example of the estimation calculation is shown below. A lever ratio is calculated from the operation force of the operation lever 5 and the connector coupling force (load on the operation lever 5) and necessary external dimensions of the operation lever 5 (length of the lever main body 9 and others) are measured, thereby determining the specifications. A denotes a length from a fulcrum point (rotary shaft portion 8) to the tip (power point) of the lever main body 9. B denotes a length from the fulcrum point (rotary shaft portion 8) to the tip (action point) of the hook portion 7. $W_1$ denotes a force applied to the tip (power point) of the lever main body 9. $W_2$ denotes a force applied to the tip (action point) of the hook portion 7. The lever ratio is a ratio of length between A and B for obtaining a necessary operation force around the fulcrum point (rotary shaft portion 8). $W_1:W_2$ is equal to A:B. If A is increased relative to B, the necessary operation force is decreased due to the principle of leverage. The stroke (ST) is a predetermined movable length which can be obtained when the operation lever 5 is rotated around the fulcrum point (rotary shaft portion 8) of the operation lever 5 in the insertion or removal of the module. ST is, for example, 14 mm.

An example of the estimation of the connector coupling force (unit: [N]) of each module in the aforementioned structure of the disk array system 500 is shown below. The coupling force mentioned here refers to the maximum coupling force necessary for the insertion or removal of the module. In each module of the basic chassis 100, the coupling force is 250N for the CTL module 10, 110N for the power source module 40, 35N for the battery module 50. In each module of the expanded chassis 200, the coupling force is 125N for the ENC module 70 and 110N for the power source module 80. As evident from above, the CTL module 10 of the basic chassis 100 has the largest coupling force in all the modules. Thus, the common operation lever 5 is designed (calculated) based on the CTL module 10.

The design of the operation lever 5 is made in the following manner. The maximum connector coupling force is 250 [N]. The specification of the lever operation force is 39.2 [N] (≈4 [kgf] or less: design target value). Since the necessary operation force cannot be obtained with one operation lever 5 for the CTL module 10, the design is made so as to provide two operation levers 5. Here, "maximum connector coupling force"÷"the number of operation levers"="load applied to a single operation lever", that is, 250÷2=125 [N].

The modules (40, 50, 70, 80) other than the CTL module 10 can be operated with a load (125N) corresponding to that of a single operation lever 5. Here, "load applied to one operation lever"÷"specification of operation force of the operation lever"=125÷39.2≈3.2. Thus, the specification of the lever ratio (A:B) is set to 3.2.

<CTL Module—Arrangement of Operation Lever>

Figure 18:
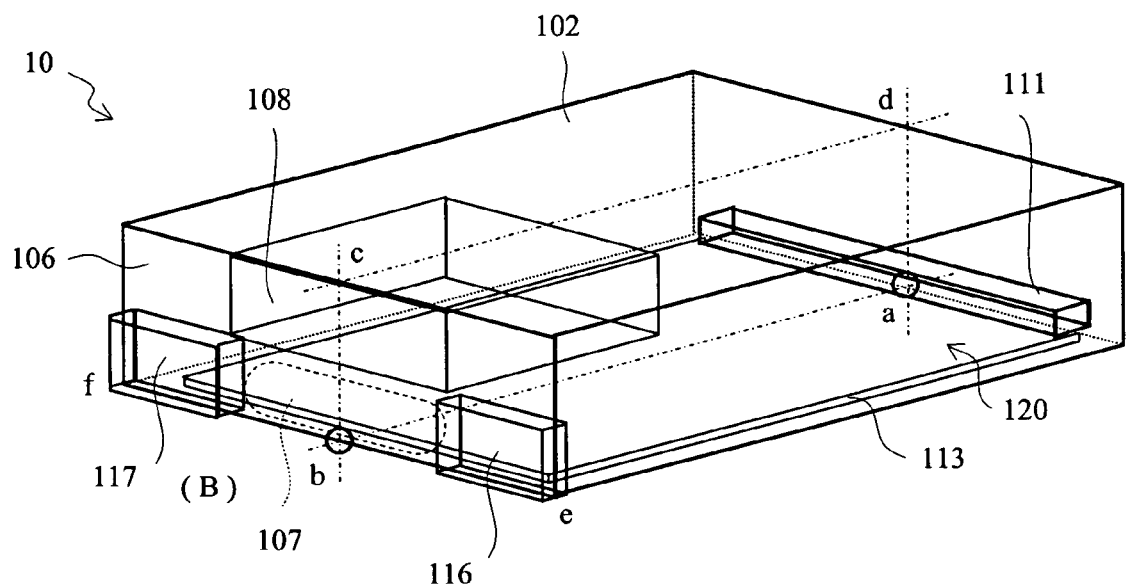
FIG. 18 is a schematic diagram for describing the design of arrangement of the operation lever to the CTL module of the basic chassis.

Next, the design of arrangement of the operation levers 104 in the CTL module 10 of the basic chassis 100 will be described with reference to FIG. 18. FIG. 18 shows the case where the module is installed on the lower side of the rear surface (B) of the rear part 2 (#2). The substrate 113 of the CTL substrate 120 is disposed on the lower surface in the CTL module 10, and the connector (BB connecting connector) 111 of the CTL substrate 120 is disposed on the lower side of the rear surface.

Similar to FIG. 17, the ideal position for the arrangement of the operation lever 104 is a position (point b) near the center of the front surface 106 on the center line (a-b) of the connector 111 on the rear surface. However, the area near this point b is inappropriate for the arrangement of the operation lever 104 due to interference in view of the mounting specification of the CTL module 10 because this area is to be an area 107 where a terminal or the like is mounted. Therefore, as a position second best to this point b, the position on a line (e-f) in the right and left direction or that on a line (b-c) in the vertical direction is considered. Since the area 107 for the terminal or a host I/F mounting area 108 exists on the line (b-c) in the vertical direction, the two operation levers 104 are disposed on the line (e-f) in the right and left direction, in particular, symmetrically in an area 116 near the right bottom corner (point e) and in an area 117 near the left bottom corner (point f).

<Power Source Module (Basic Chassis)—Arrangement of Operation Lever>

Figure 19:
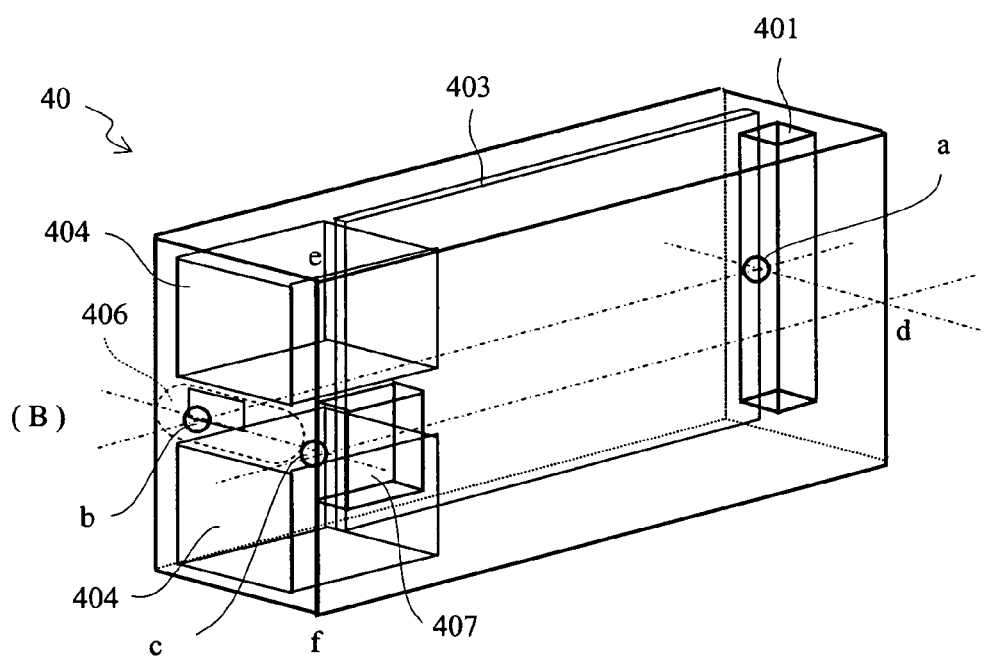
FIG. 19 is a schematic diagram for describing the design of arrangement of the operation lever to the power source module of the basic chassis.

The design of arrangement of the operation lever 46 to the power source module 40 of the basic chassis 100 will be described with reference to FIG. 19. FIG. 19 shows the case where the module is installed in the left side area of the rear surface (B) in the rear part 2 (#1). A substrate 403 of the power source unit 41 is disposed on the side surface of the chassis (outside wall 99) in the power source module 40, and a corresponding connector 401 is provided on the rear surface. Further, an area 404 in which the fans 43 of the fan unit 42 are mounted up and down is provided near the front surface at the back of the power source unit 41.

The preferred position for the arrangement of the operation lever 46 is as follows. The ideal position for the operation lever is on an extension line (a-b) from the center point a of the connector 401 toward the front surface side, in particular, near the point b on the front surface. However, arrangement of the operation lever 46 on this extension line (a-b) is inappropriate due to interference in view of the mounting specification of the power source module 40 because the substrate 403 of the power source unit 41 and the fan 43 exist on the extension line (a-b) and an inlet or LED is mounted in the area 406 near the point b and near the center of the front surface (between the exhaust holes 48). Therefore, as a position second best to the ideal point b, an area near a point c on an extension line (b-c) in the direction from the side surface (left side face) of the point b to its opposite side surface (right side surface) can be considered. The operation lever 46 is disposed in an upright position on the side surface (right side surface) near the point c so as to correspond to the direction of the connector 401.

<Battery Module—Arrangement of Operation Lever>

The design of arrangement of the operation lever 51 to the battery module 50 of the basic chassis 100 will be described with reference to FIG. 20. A substrate 53 of the battery module 50 is disposed in a part of the upper surface (right side) of the battery module 50, and a corresponding connector 52 is disposed in a part of the upper side of the rear surface (right side). Further, an area 56 in which the battery is disposed is provided on the left side in the battery module 50.

The preferred position for the arrangement of the operation lever 51 is as follows. A point b on an extension line (a-b) from the center point a of the connector 52 to the front surface is an ideal position. However, since the substrate 53 exists on this extension line (a-b), the operation lever 51 cannot be disposed thereon in view of the mounting specification of the module. Therefore, as a position second best to the ideal point b, the operation lever 51 is disposed on an extension line (b-c) downwardly extending from the point b to the lower surface, in particular, in an area 55 near the point c.

<ENC Module (Expanded Chassis)—Arrangement of Operation Lever>

The design of arrangement of the operation lever 71 to the ENC module 70 of the expanded chassis 200 will be described with reference to FIG. 21. A substrate 73 of the ENC 170 is disposed on the upper surface of the ENC module 70, and a corresponding connector 72 is disposed on the upper side of the rear surface.

The preferred position for arrangement of the operation lever 71 is described below. A point b on an extension line (a-b) extending from the center point a of the connector 72 to the front surface is an ideal position. However, the operation lever 71 cannot be disposed on this extension line (a-b) in view of the detailed mounting specification of the module because the substrate 73 of the ENC 170 exists on this extension line (a-b). Therefore, as s position second best to the point b of the ideal position, a position on an extension line (b-c) extending downwardly from the point b to the lower surface can be considered. An area 76 on the upper side of the front surface including the line (b-c) is inappropriate for the arrangement of the operation lever 71 due to interference because a path input/output connector or LED is mounted in this area. Accordingly, the operation lever 71 is disposed in an area 75 near the point c.

<Power Source Module (Expanded Chassis)—Arrangement of Operation Lever>

The design of arrangement of the operation lever 71 to the power source module 80 of the expanded chassis 200 will be described with reference to FIG. 22. A substrate 803 of the power source unit 81 is provided on the lower surface in the power source module 80, and a corresponding connector 801 is provided on the lower side of the rear surface. Further, areas 804 in which the fans 83 are to be mounted side by side are provided in the front surface of the power source module 80.

The preferred position for the arrangement of the operation lever 86 is as follows. A point b on an extension line (a-b) extending from the center point a of the connector 801 to the front surface is an ideal position. However, the operation lever 86 cannot be disposed on this extension line (a-b) in view of the detailed mounting specification of the module because the substrate 803 of the power source unit 81 or an incorporated fan 83 exists on the extension line (a-b). Therefore, as a position second best to the ideal point b, a position on an extension line (b-c) extending upwardly from the point b to the upper surface and an area near the point c can be considered. The area on the extension line (b-c) is inappropriate for the arrangement of the operation lever 86 due to interference because an LED or the like is mounted in this area, and the right and left sides of the front surface are also inappropriate because the fan 83 and an inlet are disposed in these areas. Further, the specification (condition) can be satisfied by disposing one operation lever 86 near the point c if the aforementioned necessary operation force is considered. In this example, however, the two operation levers 86 are disposed symmetrically on the right and left of the point c, that is, in an area 806 near a point e at a corner of the front surface and an area 807 near a point f in consideration of the installation of other module (ENC module 70).

<CTL Module—Arrangement of Operation Lever>

Figure 23A:
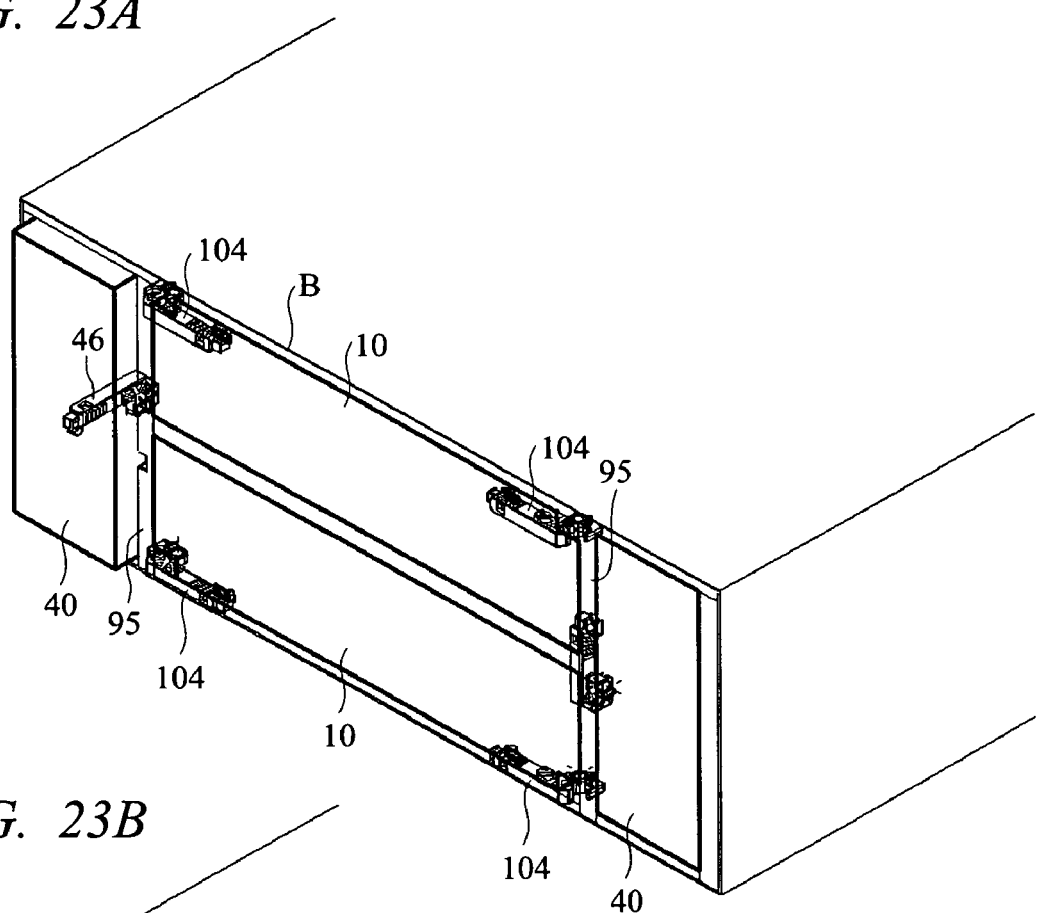
FIG. 23A is a diagram showing an example of the mounting structure of respective operation levers to the rear surface of the basic chassis.

Also, in the mounting example of the operation lever 104 to the CTL module 10 shown in FIG. 18 and FIG. 23A, the screw fixing portions 8 of the operation levers 104 are attached in the notched portions at the right and left corners of the front surface 106 of the CTL module 10. The lever main body 9 is disposed outside the external shape (box-like shape) of the CTL module 10. The lever main body 9 is provided horizontally so that it is opened (stood) from the inside of the module front surface 106 in the direction toward the side surface of the module. The receiving portion 156 of the latch portion 6 is provided at a predetermined position corresponding to the length of the lever main body 9 inside the right and left corners of the module front surface 106. The receiving portion for the hook portion 7 is provided as a recessed portion in the partition plate 95 adjacent to the side surface of the module.

<Power Source Module (Basic Chassis)—Arrangement of Operation Lever>

Also, in the mounting example of the operation lever 46 to the power source module 40 shown in FIG. 19 and FIG. 23A, since the fan 43 or the like exists inside the external shape (box-like shape) of the power source module 40, the screw fixing portion 8 and the lever main body 9 of the operation lever 46 are disposed in an area outside thereof. The receiving portion 156 of the latch portion 6 and the receiving portion 157 of the hook portion 7 are provided as recessed portions in the partition plate 95 adjacent to its side surface (right side surface). Further, the two operation levers 5 can be disposed near the corners (points e and f) in consideration of a margin for the force on the premise that they do not interfere with any adjacent module.

<Battery Module—Arrangement of Operation Lever>

Figure 20:
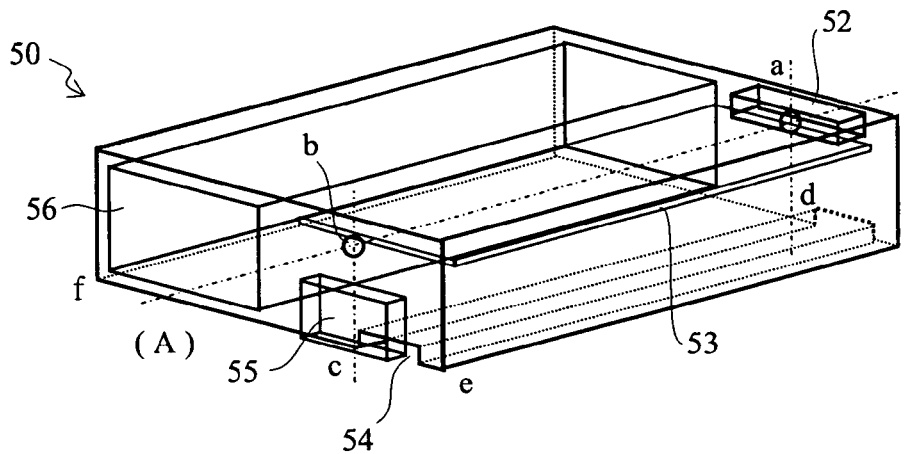
FIG. 20 is a schematic diagram for describing the design of arrangement of the operation lever to the battery module of the basic chassis.
Figure 23B:
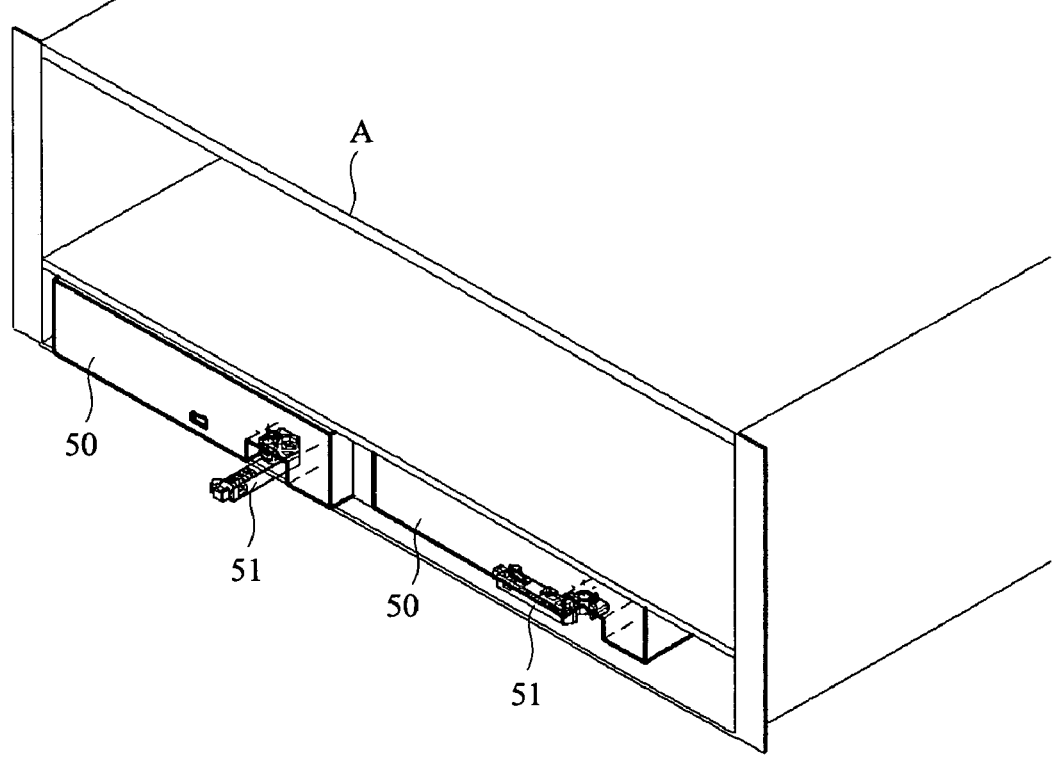
FIG. 23B is a diagram showing an example of the mounting structure of respective operation levers to the front surface of the basic chassis.

Also, in the mounting example of the operation lever 51 to the battery module 50 shown in FIG. 20 and FIG. 23B, the lower surface of the module 50 corresponds to the outside wall (lower surface) of the basic chassis 100 in an area near the point c on the lower side of the front surface in FIG. 20, and no operation lever 51 is disposed on this side. Instead, the screw fixing portion 8 of the operation lever 51 and the receiving portion are disposed on the internal side of the external shape (box-like shape) of the battery module 50. For this reason, the external shape of the battery module 50 has a notched portion (recessed portion) 54 in its lower surface side. The notched portion 54 is provided so that it penetrates from the front surface to the rear surface in the area near the line (c-d) of the lower surface corresponding to the point c in consideration of the operation for insertion or removal of the battery module 50. The screw fixing portion 8 of the operation lever 51 is attached to an end portion of the notched portion 54, and correspondingly, the receiving portion 156 of the latch portion 6 is provided at a predetermined position inside the battery module 50. Further, the receiving portion 157 of the hook portion 7 is provided as a projected portion on the outside wall side of the basic chassis 100 in the space of the notched portion 54.

<ENC Module (Expanded Chassis)—Arrangement of Operation Lever>

Figure 21:
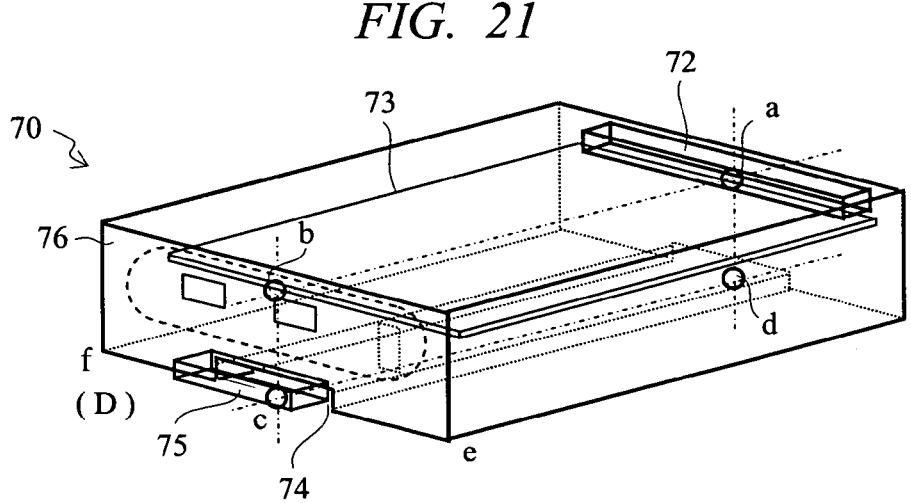
FIG. 21 is a schematic diagram for describing the design of arrangement of the operation lever to the ENC module of the expanded chassis.
Figure 24:
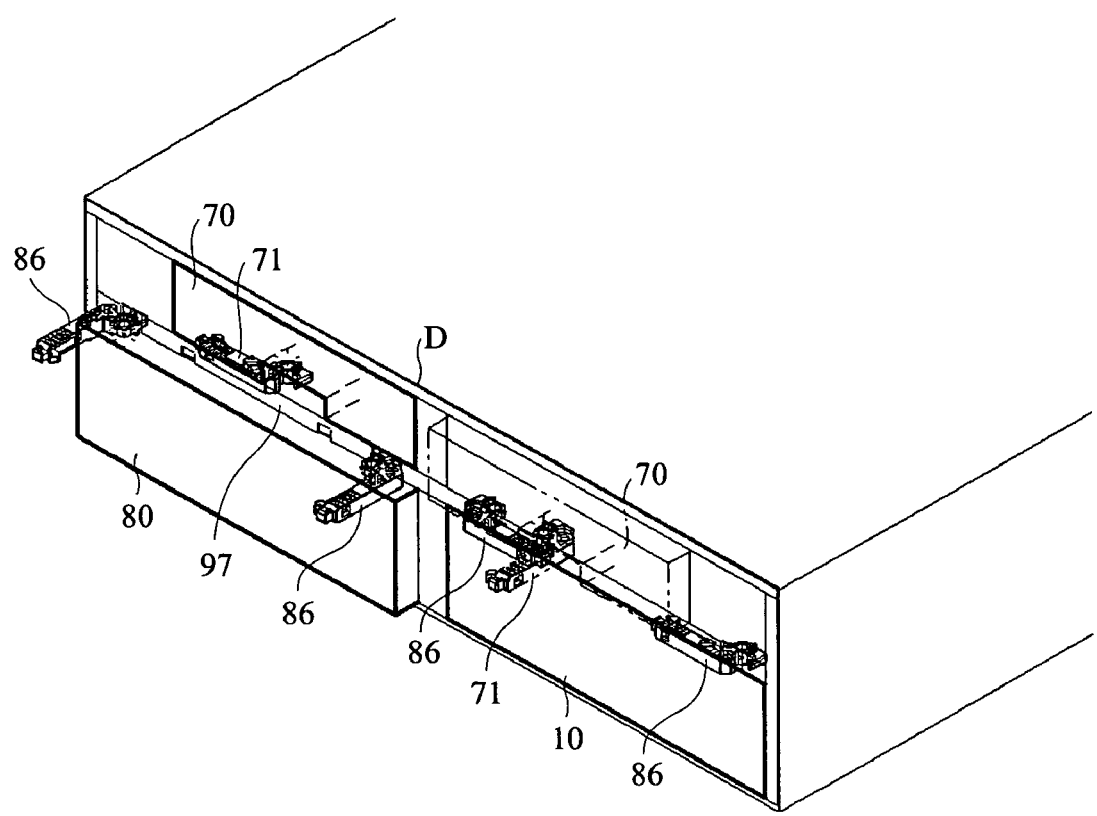
FIG. 24 is a diagram showing an example of the mounting structure of respective operation levers to the rear surface of the expanded chassis.

Also, in the mounting example of the operation lever 71 to the ENC module 70 shown in FIG. 21 and FIG. 24, the lower surface of the module 70 corresponds to the partition plate 97 of the expanded chassis 200 in an area near the point c on the lower side of the front surface in FIG. 21, and no operation lever 71 is disposed on this side (operation lever 86 of power source module 80 is provided). Instead, the screw fixing portion 8 of the operation lever 51 and the receiving portion are disposed on the internal side of the external shape (box-like shape) of the ENC module 70. For this reason, the external shape of the ENC module 70 has a notched portion (recessed portion) 74 in its lower surface side. The notched portion 74 is provided so that it penetrates from the front surface to the rear surface in the area near the center line (c-d) of the lower surface in consideration of the operation for insertion or removal of the ENC module 70. The screw fixing portion 8 of the operation lever 71 is attached to an end portion of the notched portion 74, and correspondingly, the receiving portion 156 of the latch portion 6 is provided at a predetermined position inside the ENC module 70. Further, the receiving portion 157 of the hook portion 7 is provided as a projected portion on the side of the partition plate 97 of the expanded chassis 200 in the space of the notched portion 74.

<Power Source Module (Expanded Chassis)—Arrangement of Operation Lever>

Figure 22:
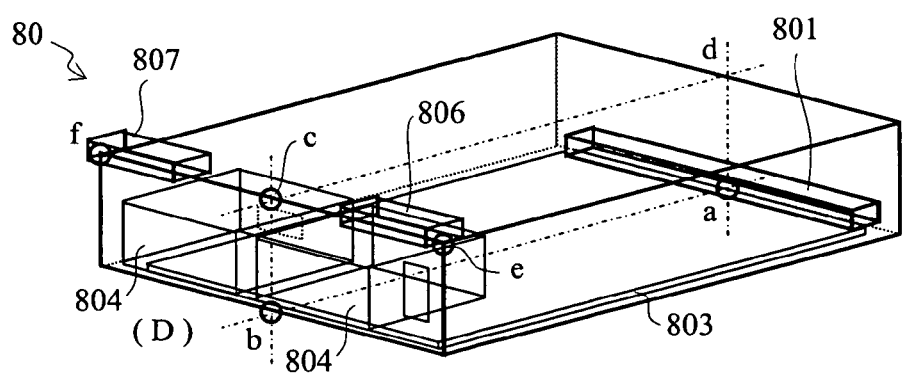
FIG. 22 is a schematic diagram for describing the design of arrangement of the operation lever to the power source module of the expanded chassis.

Also, in the mounting example of the operation lever 86 to the power source module 80 shown in FIG. 22 and FIG. 24, the screw fixing portion 8 and the lever main body 9 are disposed in an area outside the power source module 80, that is, on the side of the partition plate 97 of the expanded chassis 200 instead of inside the external shape of the power source module 80. Further, the receiving portion 156 of the latch portion 6 and the receiving portion 157 of the hook portion 7 are provided as recessed portions on the side of the partition plate 97.

In each of the above-described structures of the modules except the CTL module 10, the operation lever 5 is disposed not on the same plane as the connector but diagonally. Further, in the power source module 40 and the ENC module 70, the operation lever 5 is disposed at a central position of a side of the front surface because it can be disposed in such a manner. Further, the case of the internal mounting structure (using the recessed portion) to the external shape of the module is effective when no component interfering with the module exists at an arrangement object position of the operation lever 5, and accordingly, the module is reduced in size. Further, the case of the external mounting structure (using the projected portion) to the external shape of the module is effective when no interfering component (structure) of the chassis exists at an arrangement object position of the operation lever 5, and therefore, the module can have a box-like external shape. The detail of these mounting structures can be appropriately selected considering the relationship among plural modules.

<Structure of Operation Lever (1)>

Figure 25D:
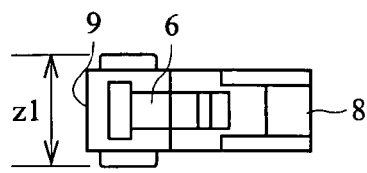
FIG. 25D is a plan view showing a detailed structure (first structure example) of the operation lever.
Figure 25A:
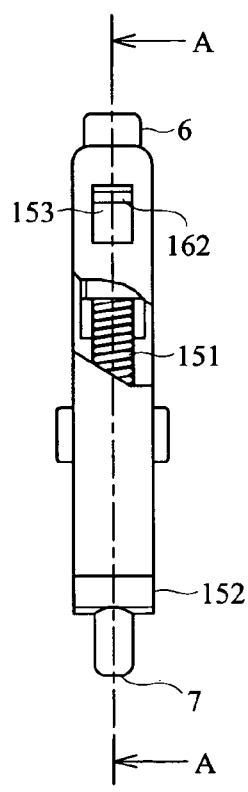
FIG. 25A is a plan view showing a detailed structure (first structure example) of the operation lever.
Figure 25B:
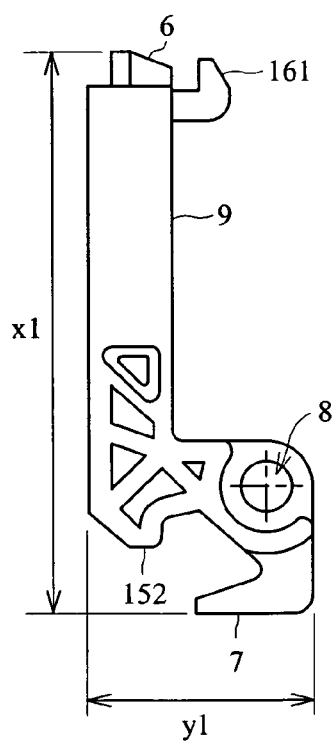
FIG. 25B is a plan view showing a detailed structure (first structure example) of the operation lever.
Figure 25C:
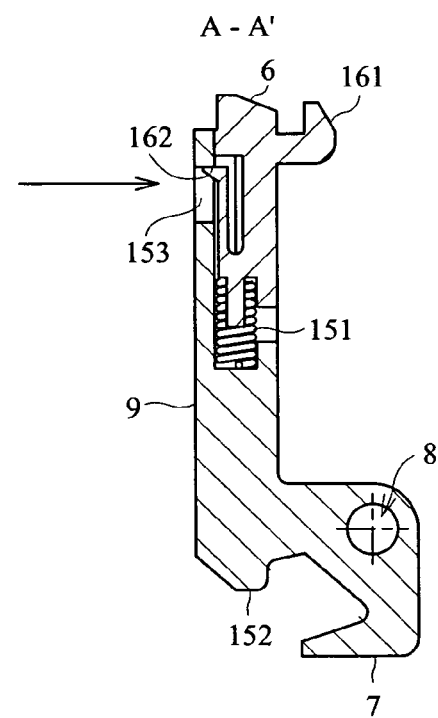
FIG. 25C is a plan view showing a detailed structure (first structure example) of the operation lever.

Next, FIG. 25A to FIG. 25D show the detailed structure (first structure example) of the operation lever 5. FIG. 25A shows a structure thereof seen from the front side, FIG. 25B shows the appearance of the side surface, FIG. 25C shows a sectional structure (section along the line A-A of FIG. 25A) thereof seen from the side, FIG. 25D shows a tip side of the operation lever 5, indicating the latch portion 6 seen from above. The operation lever 5 has the latch portion 6 which is a movable portion at one end, that is, at a tip of the lever main body 9 having a predetermined length from the rotary shaft portion 8 and has the hook portion 7 at a position near the rotary shaft portion 8 at the other end thereof. The lever main body 9 and the latch portion 6 are made of, for example, plastic.

In FIG. 25A, the tip (a portion to be pressed by a user) of the latch portion 6 projects from an end of the lever main body 9 as also shown in FIG. 25D. A hole portion 153 is provided near the tip of the lever main body 9 so as to correspond to the arrangement of the latch portion 6. A part of the latch portion 6 in the lever main body 9, in particular, a fastening portion 162 of the latch portion 6 is seen in the hole portion 153. The hook portion 7 is seen at the other end of the lever main body 9. The operation lever 5 incorporates a spring portion 151 made of metal between the lever main body 9 and the latch portion 6 for the latch action of the latch portion 6. The lever main body 9 incorporates the spring portion 151 in contact with the latch portion 6. Further, the latch portion 6 is incorporated in a state in contact with the spring portion 151.

In FIG. 25B, the lever main body 9 (elongated rod-like portion) is formed as an integrated component with the screw fixing portion 8 and the hook portion 7. In a normal state, the tip of the latch portion 6 and a claw portion 161 are projected from an end portion of the lever main body 9. A slip stopper and a predetermined shape are designed on the surface of the lever main body 9. A contact portion 152 to the chassis is provided on the other end of the lever main body 9. Next to the contact portion 152, the screw fixing portion 8 is connected integrally, and further, the hook portion 7 is connected integrally. The screw fixing portion 8 is fixed to the module side with screw and functions as a fulcrum (rotary shaft). The hook portion 7 is located on an opposite side to the contact portion 152 with respect to the position of the screw fixing portion 8.

In FIG. 25C, the main body of the latch portion 6 is incorporated so as to be concealed behind the rear side of the front surface of the lever main body 9. On the other side of the latch portion 6, for example, its projecting portion is inserted partly into the spring portion 151. The fastening portion 162 of the latch portion 6 is fastened by being hooked to the wall of the hole portion 153 in the lever main body 9, and the position (initial position in normal state) of the latch portion 6 is thus determined. The spring portion 151 is flexed when the latch portion 6 is pressed in the internal direction of the lever main body 9, and the latch portion 6 can be moved by a predetermined length.

In this configuration, in consideration of the operation by an end user, the lever main body 9 (screw fixing portion 8 and hook portion 7) is colored in a color different from that of the module main body, for example, black, and further, the latch portion 6 is colored in another different color, for example, blue. By this coloring, the components can be distinguished visibly in association with the contents of the operation (rotating action of the lever main body 9 and pressing action of the latch portion 6). The same coloring method is employed for all the operation levers 5 so that the portions which the user touches are colored in the same uniform colors. In this manner, visibility of the components is improved, thereby improving the operability.

As for the size of the operation lever 5, the length (x1) thereof in the direction of the lever main body 9 is 55.7 mm, the length (y1) in the depth direction including the screw fixing portion 8 is 21.5 mm, and the width (z1) is 11 mm.

Different from the conventional technology, the operation lever 5 does not employ any screw parts by providing the latch portion 6. Accordingly, handling of the screw parts and any special tool relating to the operation of the module is eliminated to reduce labor and time. Further, confusion with screw parts used in the module itself is prevented, thereby improving the operability.

Also, the operation lever 5 has a structure which can be disassembled to respective components (lever main body 9, latch portion 6, spring portion 151 and the like) easily without using any special tool. When disassembling the operation lever 5, the user presses the fastening portion 162 of the latch portion through the hole portion 153 in the front surface of the lever main body 9 of the operation lever 5. By this means, the hook of the fastening portion 162 to the lever main body 9 is released and the latch portion 6 is detached, and also the spring portion 151 therein is taken out.

<Attachment of Operation Lever and Operation State>

Figure 26:
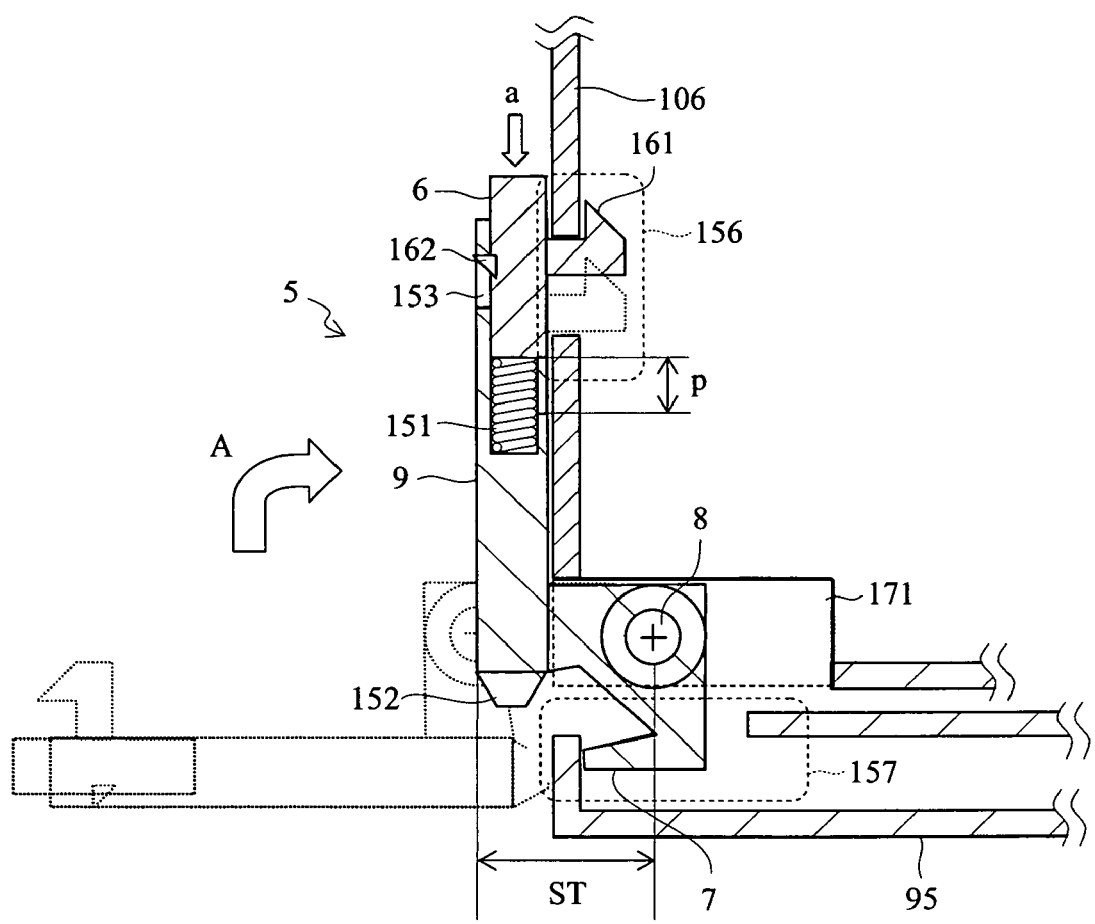
FIG. 26 is a diagram showing an example of the attachment of the operation lever to the chassis and module and a module fixing state.
Figure 27:
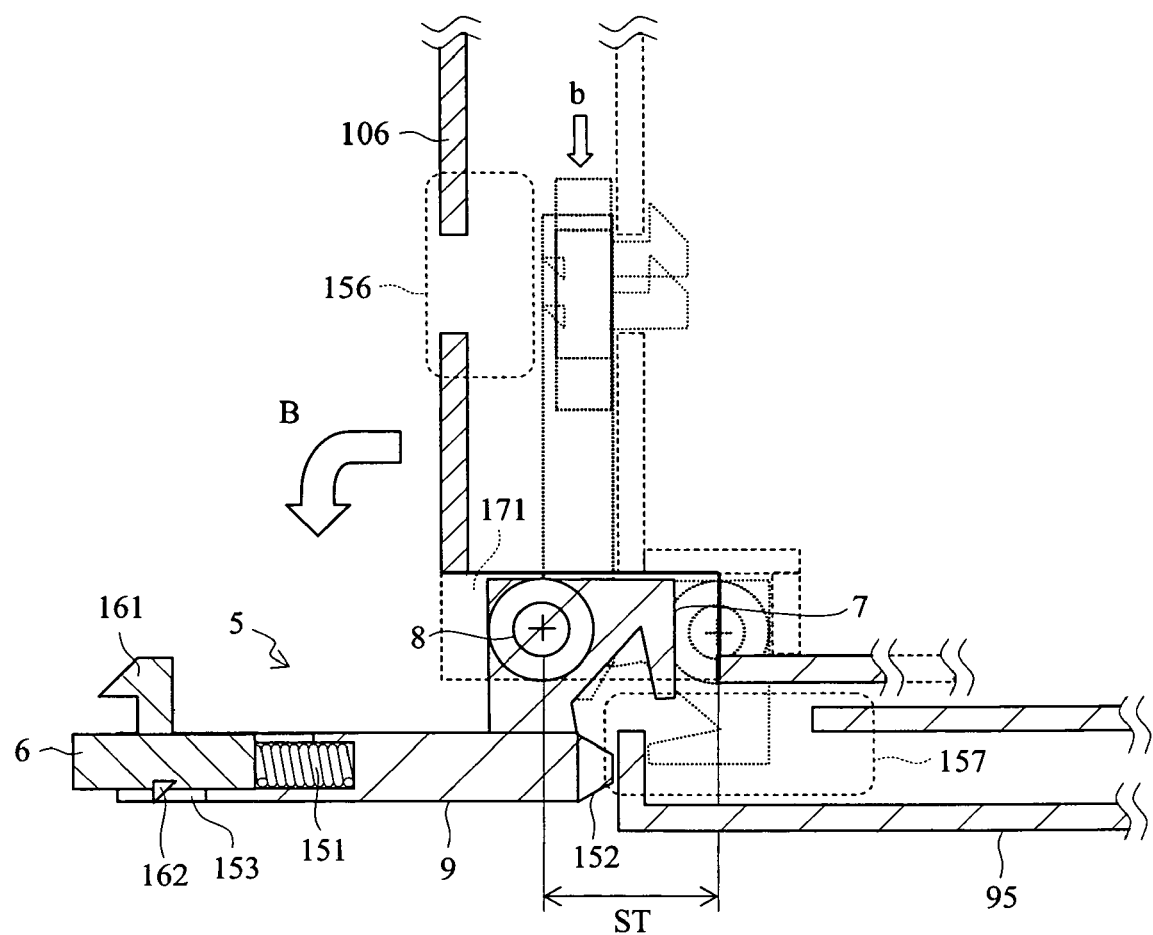
FIG. 27 is a diagram showing an example of the attachment of the operation lever to the chassis and module and a module fixation released state.

FIG. 26 and FIG. 27 show an attachment structure and operation state of the operation lever 5 to the chassis and the module. The description will be made using the CTL module 10 and the operation lever 104 as examples. FIG. 26 shows a module fixing state (corresponding to FIG. 28A) and FIG. 27 shows a module releasing state (corresponding to FIG. 28D). The module is moved by a predetermined stroke (ST) between the states shown in FIG. 26 and FIG. 27.

In FIG. 26, the latch portion 6 is fixed to the receiving portion 156 which is a part of the module (front surface 106) by an action A of moving down the lever main body 9 of the operation lever 5 and an action a of pressing the latch portion 6. By the above-described actions, the spring portion 151 is flexed and the latch portion 6 is moved by a predetermined length (p), and the claw portion 161 gets into the interior of the receiving portion 156. Consequently, the claw portion 161 is hooked and fixed to the wall of the receiving portion 156 by an elastic force of the spring portion 151.

The screw fixing portion 8 is attached to a part of the area of the module, that is, a notched (recessed portion) area 171 at the corner of the CTL module 10 (partial internal arrangement/mounting structure). The tip of the hook portion 7 gets into a part of the area on the chassis side, that is, the interior of the receiving portion 157 of the partition plate 95, and is then hooked and fixed to the wall.

In FIG. 27, the latch portion 6 is released from the receiving portion 156 which is a part of the module (front surface 106) by an action b of pressing the latch portion 6 of the operation lever 5 and an action B of moving up the lever main body 9 (in other words, action of moving it toward an operator). By the above-described actions, the spring portion 151 is flexed and the latch portion 6 is moved by a predetermined length (p), and the claw portion 161 comes from inside of the receiving portion 156 to outside. Consequently, the latch portion 6 is returned to its initial position by an elastic force of the spring portion 151. The tip of the hook portion 7 comes out of the receiving portion 157 of the partition plate 95 on the chassis side and the hooking thereof is released. Further, the contact portion 152 of the lever main body 9 gets contact with the front wall of the partition plate 95 on the chassis side.

Although the stroke (ST) for moving of the module is set to a predetermined length (14 mm) in this embodiment, any other lengths can be used.

<Operation of Operation Lever>

The operations for insertion/removal and fixation of the module (for example, CTL module 10) having the operation lever 5 to/from the area in the chassis by a user (maintenance person or end user) and corresponding mechanism will be described below with reference to FIG. 28A to FIG. 28D.

(1) Insertion of module: The module (for example, CTL module 10) is inserted and fixed into the area in the chassis by a user in the following manner. A user inserts a module into the area in the chassis through an opening surface and moves down the lever main body 9 of the operation lever 5 (by this means, the module is connected to a connector on the backboard side). Then, along with this action (consecutively), the latch portion 6 at the tip of the lever main body 9 is pressed toward the deep side so that the latch portion 6 is fixed to the receiving portion 156. At the same time, the hook portion 7 of the operation lever 5 is fixed to the receiving portion 157 on the chassis side. By this means, the module is fixed. In a series of actions described above, it is assumed that the latch portion 6 at the tip completes insertion and fixation of the module without any special operation. This will be described in detail below.

Figure 28A:
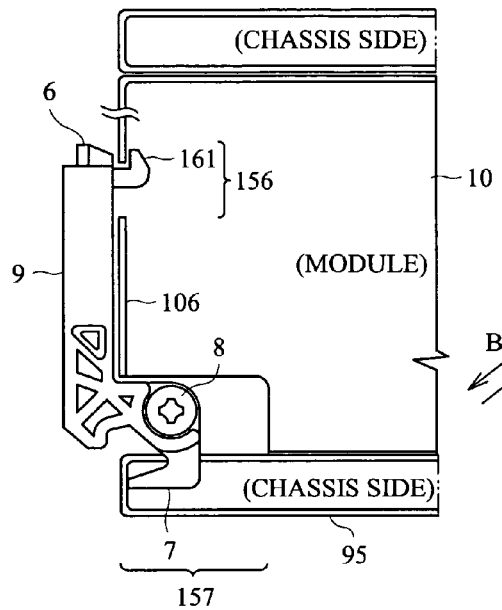
FIG. 28A is a diagram showing the operations of insertion/removal and fixation of the module having the operation levers to and from an area in the chassis by a user and corresponding mechanism.
Figure 28C:
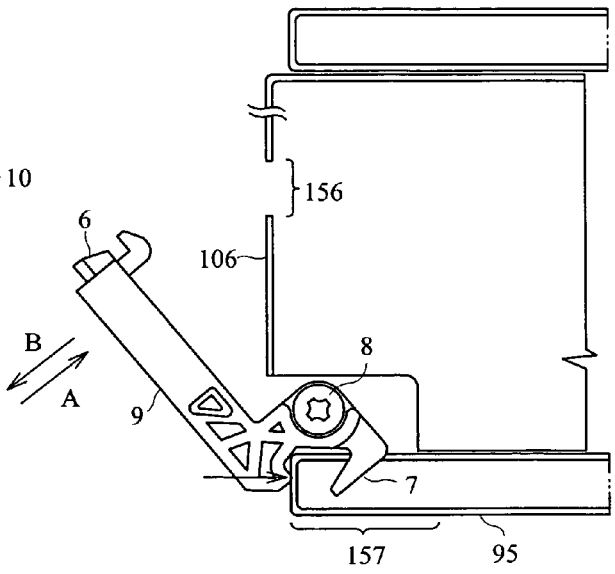
FIG. 28C is a diagram showing the operations of insertion/removal and fixation of the module having the operation levers to and from an area in the chassis by a user and corresponding mechanism.
Figure 28B:
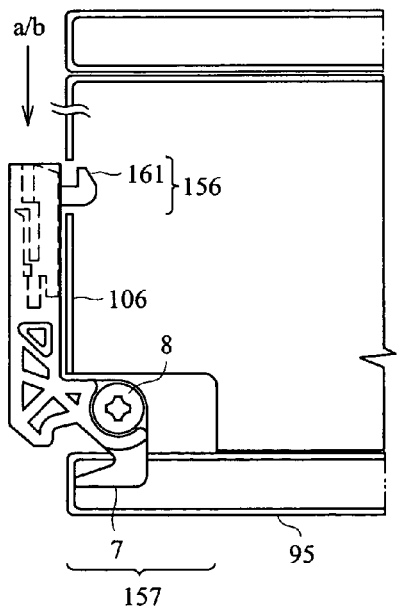
FIG. 28B is a diagram showing the operations of insertion/removal and fixation of the module having the operation levers to and from an area in the chassis by a user and corresponding mechanism.
Figure 28D:
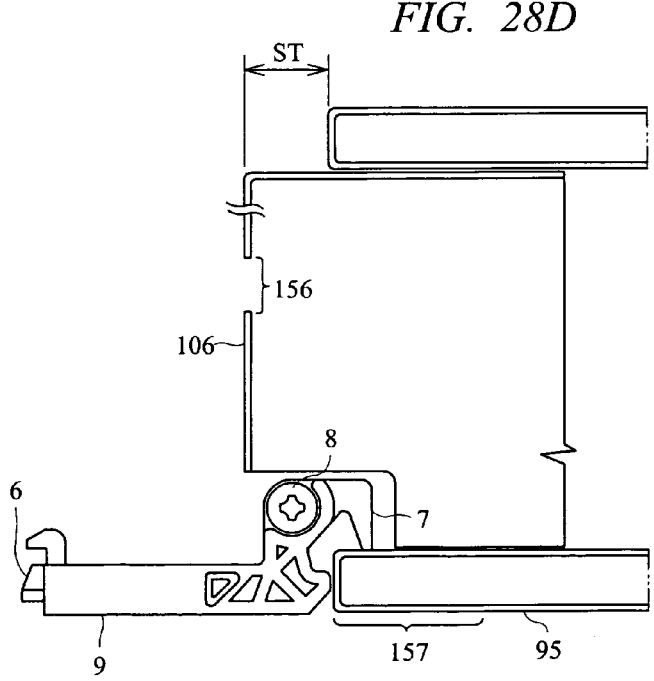
FIG. 28D is a diagram showing the operations of insertion/removal and fixation of the module having the operation levers to and from an area in the chassis by a user and corresponding mechanism.

(1-1) FIG. 28D shows a state d, that is, the state of a stroke position when the module is inserted into the internal area of the chassis or the state of releasing the fixation of the module. A user holds the module and the operation lever and inserts the rear surface side of the module into the internal area of the chassis through an opening surface of the chassis, and then pushes it toward the deep side along the guide rail. The module is inserted up to a position at which the operation lever stands at right angle with respect to the module surface and the operation lever gets contact with the chassis (partition plate 95). The module is located at a position at which it projects by an amount equivalent to the stroke of the operation lever from a fixing position in the internal area of the chassis.

(1-2) FIG. 28C shows a state c, that is, a state at the middle of the operation of inserting the module (action A). More specifically, the module is moved by an amount equivalent to the stroke from the position of the state d to a fixing position by the action based on the principle of leverage using the operation lever, that is, by the action A of rotating the lever main body 9 to move down the same with respect to the module front surface (106). By this means, the module is completely inserted into the internal area of the chassis. At the same time, the connector (111) on the rear surface of the module is connected to the connector (201) on the backboard (the connectors are coupled with each other).

(1-3) FIG. 28B shows a state b, that is, a state when the latch portion 6 is fixed (action a). Along with the action A of moving down the lever main body 9 in the state c (consecutively), the action a of pressing the latch portion 6 at the tip of the lever main body 9 into the lever main body 9 smoothly is performed. In this manner, the spring portion 151 is flexed and the claw portion 161 of the latch portion 6 gets into the inside of the receiving portion 156 on the module side (or chassis side).

Although the description of the action a to the latch portion 6 is clearly separated from that of the action A for the easy understanding, the action a is automatically achieved by the motions of the claw portion 161 of the latch portion 6 and the spring portion 151 only by the action A which is unconscious of the action a. That is, as described above, insertion and fixation of the module are completed without any special operation.

(1-4) FIG. 28A shows a state a, in which the module is fixed. Subsequent to the action in the state b, the claw portion 161 of the latch portion 6 is hooked and fixed (latched or locked) to the inside of the receiving portion 156 (latch action). At the same time, the hook portion 7 is hooked and fixed to the inside of the receiving portion 157 on the chassis side. In this manner, the module is fixed completely. In this state a, the lever main body 9 keeps a parallel contact with the module surface, the latch portion 6 is completely fixed to the receiving portion 156, and the hook portion 7 is completely fixed to the receiving portion 157. In other words, the module is connected to the backboard through connectors.

(2) Removal of module: The operation by a user for removing the module (for example, CTL module 10) from the internal area of the chassis and releasing the fixation thereof is as follows. In the module fixation state, a user presses the latch portion 6 at the tip of the lever main body 9 and simultaneously (consecutively) moves up (pulls) the lever main body 9 to move the same toward the side of the user. Consequently, the fixing state of the latch portion 6 to the receiving portion 156 is released, and at the same time, the fixing state of the hook portion 7 to the receiving portion 157 on the chassis side is released. Also, the other tip of the lever main body 9 is brought into a contact with a part of the chassis by the principle of leverage, and the hook portion 7 comes out of the inside of the receiving portion 157 on the chassis side. In this manner, the connectors of the module are disconnected, and the module itself is released from the fixing state. Further, when the lever main body 9 is moved up (pulled) toward the user, the module is moved by an amount equivalent to a predetermined stroke (ST) toward the user from the internal area of the chassis or the fixing position, and after that, the module can be removed completely by detaching the same. The detail will be described below.

(2-1) FIG. 28A shows a state a, that is, a module fixing state. The lever main body 9 is located in parallel to the module surface, the latch portion 6 is completely fixed to the receiving portion 156, and the hook portion 7 is fixed completely to the receiving portion 157. In other words, the module is connected to the backboard through connectors.

(2-2) FIG. 28B shows a state b, that is, a state when the fixation of the latch portion is released (action b). A user grips the operation lever of the module and presses the latch portion 6 at the tip of the lever main body 9 toward the interior of the lever main body 9. By this means, the fixing state of the claw portion 161 of the latch portion 6 to the inside of the receiving portion 156 on the module side (or chassis side) is released.

(2-3) FIG. 28C shows a state c, that is, a state at the middle of the operation of removing the module (action B). Subsequent to the state b, the module is moved so that it comes out by an amount equivalent to the predetermined stroke (ST) by the action based on the principle of leverage. That is, along with the action in the state b (consecutively), the lever main body 9 is rotated smoothly so as to move up the same (pull) toward the user with respect to the front surface of the module (106). By the action to move up (pull) the lever main body 9, the other tip (contact portion 152 on an opposite side to the latch portion 6) of the lever main body 9 is pressed against a part of the chassis (front side of the receiving portion 157 of the partition plate 95), and the hook portion 7 comes out of the inside of the receiving portion 157 on the chassis side by the principle of leverage. In this manner, the fixing state of the latch portion 6 to the receiving portion 156 on the module side (or chassis side) is released, and simultaneously, the hooking of the hook portion 7 to the receiving portion 157 on the chassis side is also released. The consecutive actions of the pressing action of the latch portion 6 and the rotating (moving up) action of the lever main body 9 is achieved by only sliding the lever main body 9 slightly sideway while pressing the latch portion 6. Accordingly, this is a smooth action with a small load.

(2-4) FIG. 28D shows a state d, that is, a state when the module is removed from the internal area of the chassis (at stroke (ST) position) or the state of releasing the fixation of the module. When the rotation of the lever main body 9 ends and the lever main body 9 stands at right angle with respect to the module surface, the module is moved by an amount equivalent to a predetermined stroke (ST) obtained by that action toward the user from the fixing position in the area of the chassis and it is projected outside. Thereafter, the module is detached by moving it toward the user along guide rails. In this manner, it is taken out of the internal area of the chassis.

<Structure of Operation Lever (2)>

Next, a different structure (example of the structure) of the operation lever 5 will be described as another embodiment. Each structure example exists as variations of the structure of the latch portion 6, the hook portion 7, the screw fixing portion (rotary shaft portion) 8, and the lever main body 9.

Figure 29:
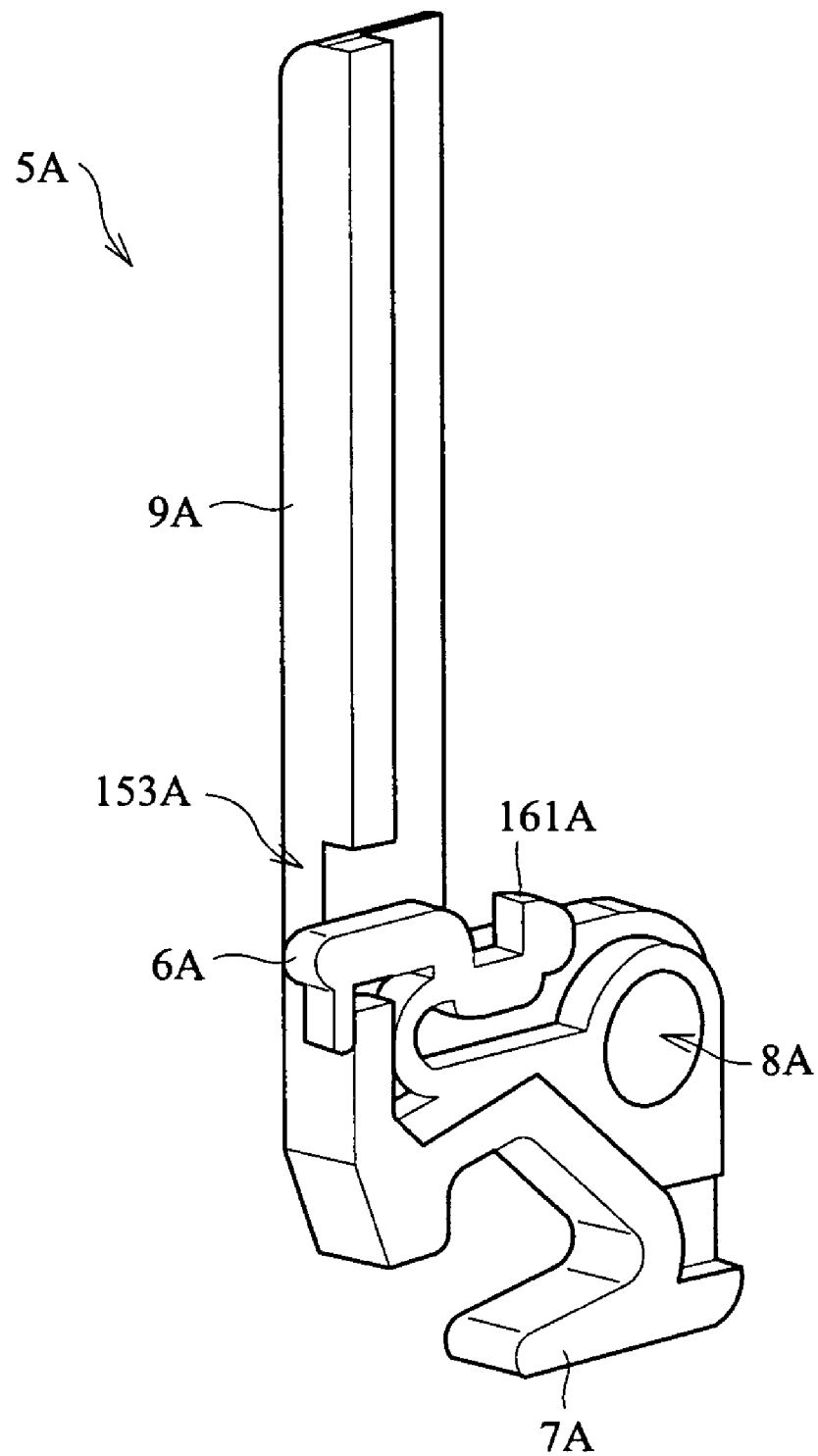
FIG. 29 is a diagram showing the sectional structure of the operation lever of a second structure example as another embodiment.

An operation lever 5A as a second structure example will be described with reference to FIG. 29 (sectional structure). In this operation lever 5A, a latch portion 6A (for example, blue) is attached to an integrated structure (for example, black) including a lever main body 9A, a rotary shaft portion 8A, and a hook portion 7A. This structure does not need the spring portion 151. Different from the first structure example, the latch portion 6A is not disposed at the front tip side of the lever main body 9A but on the other tip side (contact portion 152 side) near the screw fixing portion 8A (fulcrum point). A part of the latch portion 6A is projected from a hole portion 153A on the fulcrum side of the lever main body 9A. A claw portion 161A of the latch portion 6A is disposed between the hole portion 153A and the screw fixing portion 8A. When a user presses a part of the latch portion 6A (shifts it in the right or left direction), the latch portion 6A itself is deformed to displace the claw portion 161A, and the claw portion 161A is hooked and fixed to or released from the receiving portion 156. The structures of the receiving portions (156, 157) on the chassis side and module side are the same as those of the first structure example.

<Structure of Operation Lever (3)>

Figure 30:
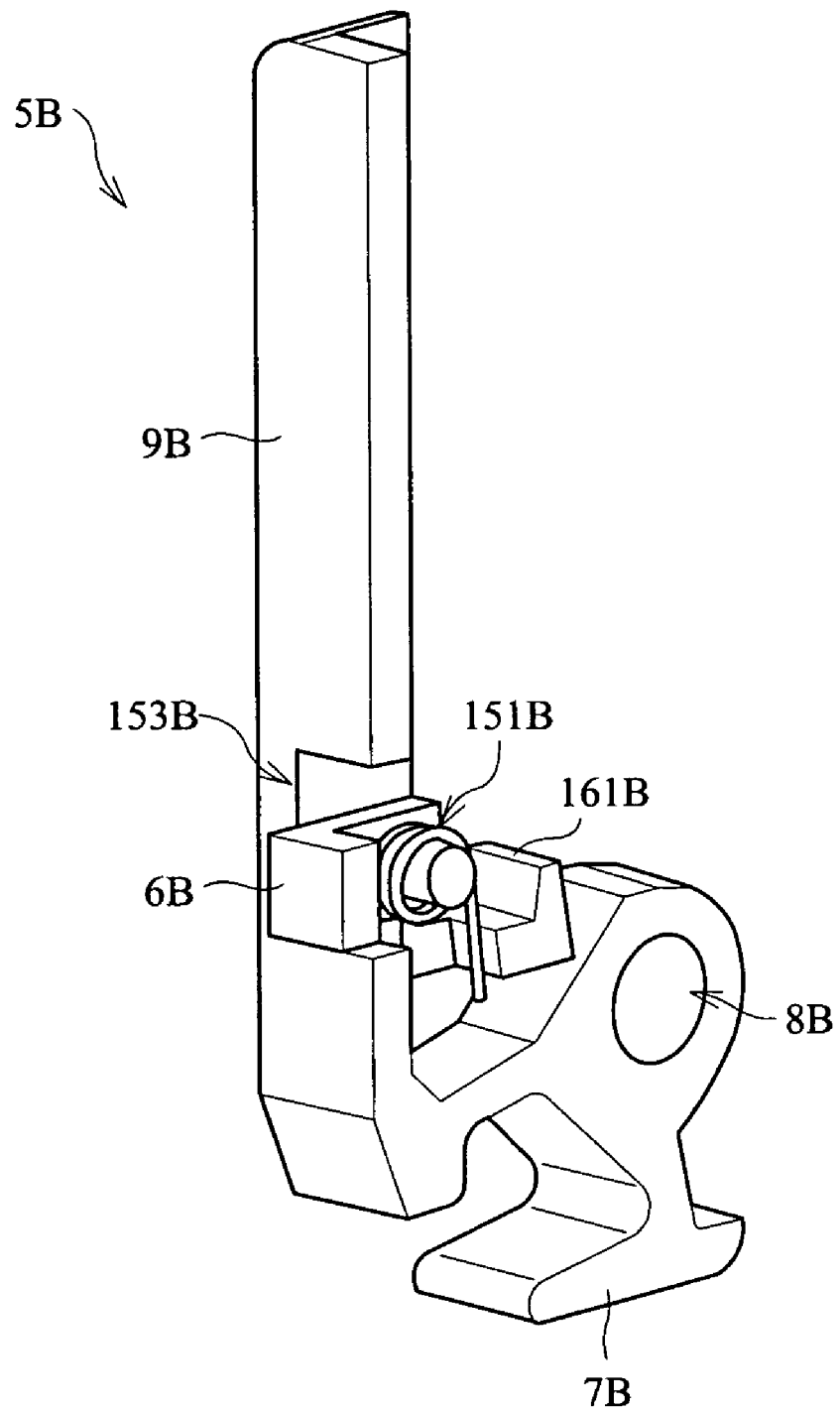
FIG. 30 is a diagram showing the sectional structure of the operation lever of a third structure example as another embodiment.

An operation lever 5B as a third structure example will be described with reference to FIG. 30. Similar to the second structure example (5A), in the operation lever 5B, a latch portion 6B is not disposed on the front tip side of a lever main body 9B but on the other tip side. Further, the latch portion 6B has a rotary shaft portion, and a spring portion 151B is attached to the rotary shaft portion. By the action of pressing a part of the latch portion 6B projecting from a hole portion 153B in the lever main body 9B (by shifting it in the right or left direction), a force of the spring portion 151B is applied, and the claw portion 161B on the other tip is fixed to or released from the receiving portion 156.

<Structure of Operation Lever (4)>

Figure 31:
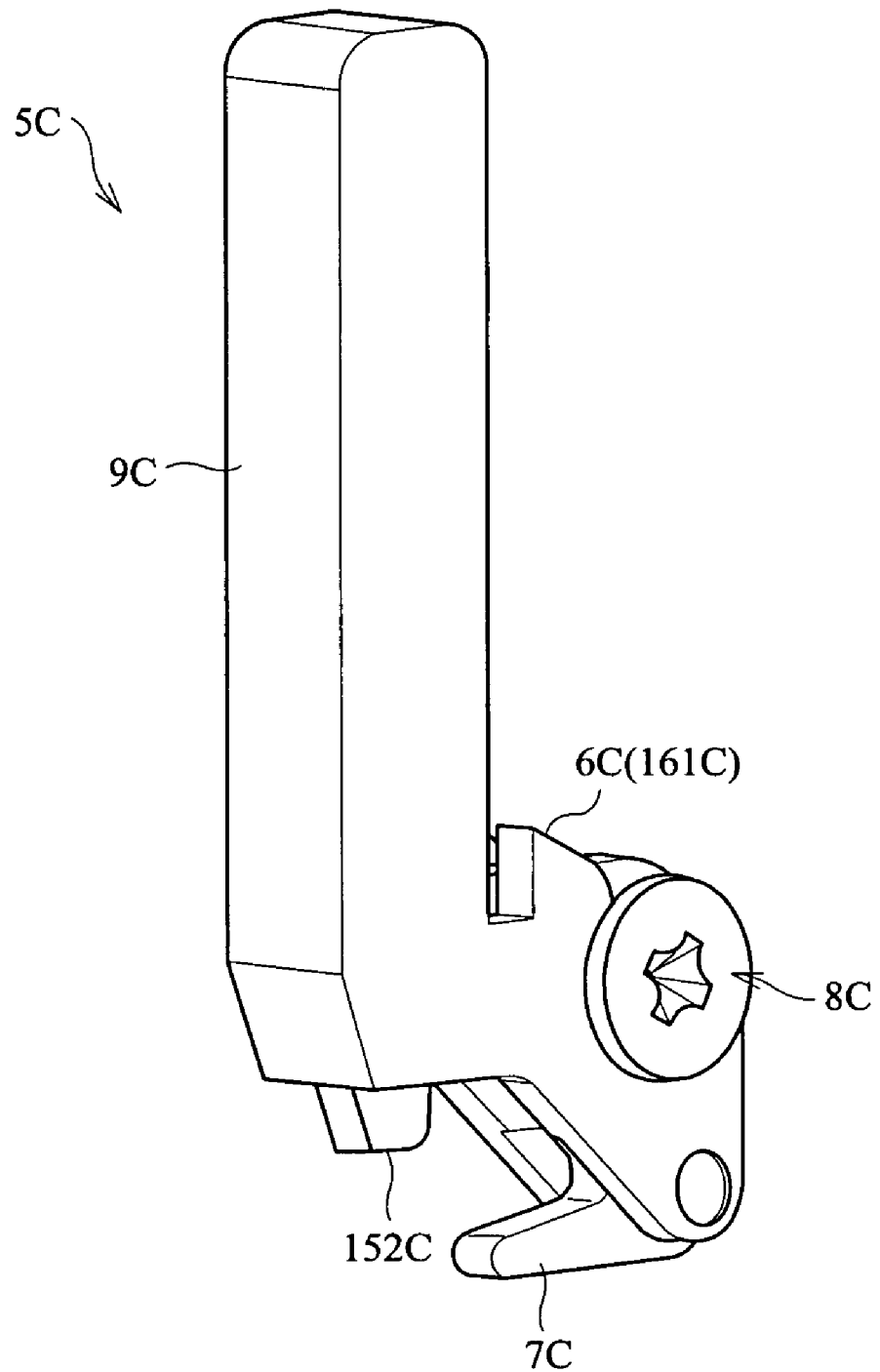
FIG. 31 is a diagram showing the sectional structure of the operation lever of a fourth structure example as another embodiment.

An operation lever 5C as a fourth structure example will be described with reference to FIG. 31. In the operation lever 5C, a lever main body 9C and a latch portion 6C (particularly a claw portion 161C) are integrated. Also, a screw fixing portion 8C, a hook portion 7C, and a contact portion 152C are integrally formed of plate metal. A spring portion 151C is incorporated in the lever main body 9C. When the fixation of the module is released, the latch portion 6C is released to rotate the lever main body 9C.

<Structure of Operation Lever (5)>

Figure 32:
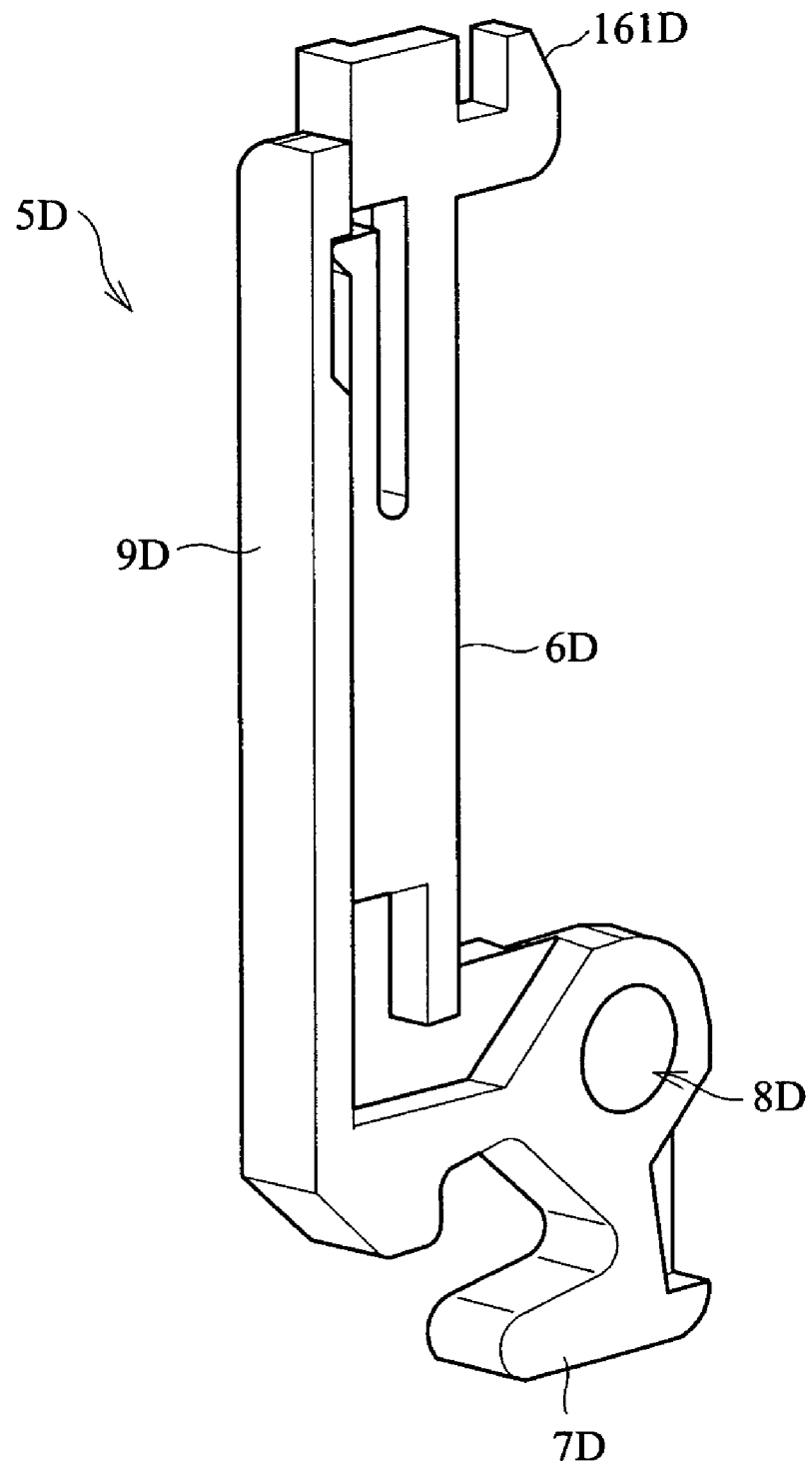
FIG. 32 is a diagram showing the sectional structure of the operation lever of a fifth structure example as another embodiment.

An operation lever 5D as a fifth structure example will be described with reference to FIG. 32. Similar to the first structure example, in the operation lever 5D, a latch portion 6D (particularly a claw portion 161D and a portion to be pressed by a user) is disposed on the front tip side of a lever main body 9D. The lever main body 9D, a screw fixing portion 8D, and a hook portion 7D are integrated, and a rod-like construction which is the latch portion 6D is attached thereto. The latch portion 6 is disposed on the rear side of the front surface of the lever main body 9D. Similar to the first structure example, on the other end side of the structure of the latch portion 6 near the other tip of the lever main body 9D, an area 154 in which a spring portion (not shown) is incorporated is provided. When releasing the fixation of the module, the fixing state is released by pressing a part of the latch portion 6 on the front tip side of the lever main body 9D.

The first and fifth structure examples have an advantage that the rotating action of the lever main body 9 and the latching action can be easily associated and the operation thereof is easy to execute because the latch portion 6 (portion to be pressed by a user) is disposed on the front tip side of the lever main body 9. Further, the second to fourth structure examples have an advantage that processing of the receiving portion 156 (hole portion or the like) on the chassis side or module side with respect to the latch portion 6 is not necessary (shared by the receiving portion 157 with respect to the hook portion 7).

Effects of the Embodiments

As described above, although plural types of operating structures corresponding to plural types of modules coexist conventionally, according to the embodiments described above, those operating structures are standardized and the operability of the entire disk array system and all the modules is improved. Further, a necessity of using special knowledge about operation of the module or any special tool such as screw driver is eliminated and a mistake in operation of screws or the like of the module itself can be avoided. Therefore, it is possible to provide a disk array system suitable for the operation by an end user.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be applied to a disk array system which needs to be provided with a cooling structure for a heat generating portion such as HDD.

What is claimed is:

1. A disk array system provided with a group of storage devices and a controller for controlling these devices, comprising:

a basic chassis having openings in front and rear surfaces thereof and a backboard fixed at a midpoint in its interior; and a plurality of storage device modules, two duplicated battery modules, two duplicated controller modules and two duplicated power source modules as modules installed by insertion/removal and fixation to a front part and a rear part of the backboard in the basic chassis, wherein the plurality of storage device modules and the two battery modules are installed to the front part of the basic chassis and the two controller modules and the two power source modules are installed to the rear part, object modules including the controller modules, the battery modules, and the power source modules are provided with a common operating structure for operations of insertion/removal and fixation thereof, the operating structure is a lever structure using the principle of leverage and it includes a rotary shaft portion which is fixed to the object module and serves as a fulcrum point, a lever main body located on one side of the rotary shaft portion, a latch portion connected to the lever main body and containing no screw part, and a hook portion located on the other side of the rotary shaft portion, and when the object module is inserted and fixed, by an action of rotating the lever main body of the operating structure and pressing the latch portion by a user, the latch portion is fixed to a receiving portion of the object module or the chassis, the hook portion is fixed to the receiving portion on the chassis side, and a connector on a rear surface of the object module and a connector on the backboard are connected to each other.

2. The disk array system according to claim 1 further comprising: an expanded chassis which is electrically connected to the basic chassis and has openings in front and rear surfaces thereof and a backboard fixed at a midpoint in its interior; and a plurality of storage device modules, two duplicated enclosure modules and two duplicated power source modules as modules installed by insertion/removal and fixation to a front part and a rear part of the backboard in the expanded chassis, wherein the plurality of storage device modules are installed to the front part of the expanded chassis and the two enclosure modules and the two power source modules are installed to the rear part, and object modules including the enclosure modules and the power source modules of the expanded chassis are provided with a common operating structure for operations of insertion/removal and fixation thereof.

3. The disk array system according to claim 2, wherein the battery module of the basic chassis and the enclosure module of the expanded chassis incorporate a board on one surface side and a connector to be connected to the backboard on one side of the rear surface, as for the operating structures of the battery module and the enclosure module, the operating structure is disposed on one side of the front surface so as to be located on an opposite side to that of the connector arranged on the rear surface, and one side of the front surface has a notched portion for providing the operating structure and a receiving portion on the chassis side, which penetrates from the front surface to the rear surface of the module, and in the notched portion, the rotary shaft portion is screwed, the latch portion is fixed to the receiving portion on the module side, and the hook portion is fixed to the receiving portion on the chassis side.

4. The disk array system according to claim 2, wherein the power source module of the expanded chassis incorporates a board of a power source unit near the rear surface side, a fan unit near the front surface side, and a connector to be connected to the backboard on one side of the rear surface, and as for the operating structures of the power source modules of the expanded chassis, the two operating structures are disposed near right and left corners on one of upper and lower sides of the front surface so as to be located on an opposite side to that of the connector arranged on the rear surface, and the rotary shaft portion is screwed near the right and left corners of one of upper and lower sides of the front surface, the latch portion is fixed to the receiving portion on the chassis side, and the hook portion is fixed to the receiving portion on the chassis side.

5. The disk array system according to claim 1, wherein, based on an operation force necessary for each module estimated from a coupling force, arrangement, and number of connectors of the object modules to be connected to the backboard, a configuration of one or more operating structures to be provided to the controller module is determined with reference to the controller module whose operation force is the largest, and the one or more operating structures are provided to each of other object modules.

6. The disk array system according to claim 1, wherein, in the operation lever, the lever main body, the rotary shaft portion, and the hook portion are formed as an integrated structure, a part of the latch portion is projected from a tip of the lever main body as a portion operated by a user, a spring portion for a latch action is incorporated in the lever main body and between the lever main body and the latch portion, and an initial position is determined when a fastening portion which is a part of the latch portion is fixed to a hole portion which is a part of the lever main body, and by a user's action of pressing a tip portion of the latch portion or an action of the latch portion being pressed caused by a rotation of the lever main body, the spring portion is flexed and the latch portion is moved in a length direction of the lever main body, and at the same time, a claw portion which is a part of the latch portion is moved, and thus, the operation lever is enabled to be fixed to or released from the receiving portion.

7. The disk array system according to claim 1, wherein, in all the operating structures, the lever main body is colored in a different color from that of the module and the latch portion is colored in a further different color.

8. The disk array system according to claim 1, wherein the operating structure can be disassembled to respective components without any tool, and when it is disassembled, a fastening portion which is a part of the latch portion is pressed by a user through a hole portion in a front surface of the lever main body of the operating structure to release hooking of the fastening portion to the lever main body, thereby detaching the latch portion from the lever main body and taking out the spring portion.

9. The disk array system according to claim 1, wherein the controller module incorporates a controller board on one surface side and has a connector to be connected to the backboard on one side of the rear surface and a component mounting area near a center of the front surface, as for the operating structures of the controller module, the two operating structures are disposed symmetrically at right and left corners on one side of the front surface so as to be located on the same side as that of the connector arranged on the rear surface, and the rotary shaft portion is screwed to each of the right and left corners on one side of the front surface, the latch portion is fixed to a receiving portion which is a part of the module front surface, and the hook portion is fixed to a receiving portion on the chassis side.

10. The disk array system according to claim 1, wherein the power source module of the basic chassis incorporates a board of a power source unit having a connector to be connected to the backboard near the rear surface side and a fan unit near the front surface side, as for the operating structure of the power source module of the basic chassis, the operating structure is disposed near a center of one of right and left sides of the front surface of the module so as to be located on an opposite side to that of the connector arranged on the rear surface, and the rotary shaft portion is screwed near the center of the side of the front surface, the latch portion is fixed to the receiving portion on the chassis side, and the hook portion is fixed to the receiving portion on the chassis side.

* * * * *